United States Patent
Alshina et al.

(10) Patent No.: US 9,544,600 B2
(45) Date of Patent: **\*Jan. 10, 2017**

(54) METHOD AND DEVICE FOR ENCODING AND DECODING VIDEO

(71) Applicant: SAMSUNG ELECTRONICS CO., LTD., Suwon-si (KR)

(72) Inventors: Elena Alshina, Suwon-si (KR); Jianle Chen, Suwon-si (KR); Woo-jin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,846

(22) Filed: Feb. 20, 2015

(65) Prior Publication Data

US 2015/0172707 A1    Jun. 18, 2015

Related U.S. Application Data

(63) Continuation of application No. 14/345,098, filed as application No. PCT/KR2012/007389 on Sep. 14, 2012.

(Continued)

(51) Int. Cl.
*H04N 19/105* (2014.01)
*H04N 19/176* (2014.01)
(Continued)

(52) U.S. Cl.
CPC .......... *H04N 19/105* (2014.11); *H04N 19/107* (2014.11); *H04N 19/109* (2014.11);
(Continued)

(58) Field of Classification Search
CPC .................. H04N 19/00018; H04N 19/00884; H04N 19/105; H04N 19/107; H04N 19/109; H04N 19/136; H04N 19/146; H04N 19/176; H04N 19/182; H04N 19/19; H04N 19/503; H04N 19/513; H04N 19/57; H04N 19/61; H04N 19/0003
(Continued)

(56) References Cited

U.S. PATENT DOCUMENTS 8,548,065 B2 * 10/2013 Ngan ..................... H04N 19/46
375/240.29
8,565,307 B2   10/2013 Matsuda et al.
(Continued)

FOREIGN PATENT DOCUMENTS

CA           2876795 A1    2/2011
KR    10-2006-0044356 A    5/2006
(Continued)

OTHER PUBLICATIONS

Communication dated Sep. 15, 2015, issued by the Japanese Patent Office in counterpart Japanese Application No. 2014-530597.
(Continued)

*Primary Examiner* — Christopher S Kelley
*Assistant Examiner* — Deirdre Beasley
(74) *Attorney, Agent, or Firm* — Sughrue Mion, PLLC

(57) ABSTRACT

A method and apparatus for encoding and decoding a video are provided. The method of encoding the video includes: determining whether a unidirectional motion estimation mode and a bidirectional motion estimation mode are to be used based on a size of a current prediction unit to be encoded, performing the motion estimation and the motion compensation on the current prediction unit according to the determining of whether the unidirectional motion estimation mode and the bidirectional motion estimation mode are to be used, determining an optimum motion estimation mode of (Continued)

the current prediction unit based on an encoding cost of the current prediction unit obtained through the performing of the motion estimation and the motion compensation, and encoding information indicating the determined optimum motion estimation mode based on the size of the current prediction unit.

2 Claims, 29 Drawing Sheets

Related U.S. Application Data

(60) Provisional application No. 61/534,499, filed on Sep. 14, 2011.

(51) Int. Cl.
*H04N 19/61* (2014.01)
*H04N 19/107* (2014.01)
*H04N 19/109* (2014.01)
*H04N 19/136* (2014.01)
*H04N 19/146* (2014.01)
*H04N 19/182* (2014.01)
*H04N 19/19* (2014.01)
*H04N 19/503* (2014.01)
*H04N 19/513* (2014.01)
*H04N 19/57* (2014.01)

(52) U.S. Cl.
CPC ......... *H04N 19/136* (2014.11); *H04N 19/146* (2014.11); *H04N 19/176* (2014.11); *H04N 19/182* (2014.11); *H04N 19/19* (2014.11); *H04N 19/503* (2014.11); *H04N 19/513* (2014.11); *H04N 19/57* (2014.11); *H04N 19/61* (2014.11)

(58) Field of Classification Search
USPC .................. 375/240, 240.16, 240.02, 240.12
See application file for complete search history.

(56) References Cited

U.S. PATENT DOCUMENTS

| | | | |
|---|---|---|---|
| 8,995,527 B2 | 3/2015 | Panchal et al. | |
| 9,135,717 B2* | 9/2015 | Chujoh | G06T 7/2013 |
| 2005/0207496 A1* | 9/2005 | Komiya | H04N 19/105 375/240.16 |
| 2005/0286630 A1* | 12/2005 | Tong | H04N 19/00 375/240.03 |
| 2007/0217512 A1* | 9/2007 | Matsuda | H04N 19/105 375/240.16 |
| 2007/0286284 A1* | 12/2007 | Ito | H04N 19/51 375/240.16 |
| 2010/0086032 A1* | 4/2010 | Chen | H04N 19/176 375/240.12 |
| 2010/0158111 A1* | 6/2010 | Bordes | G06T 1/005 375/240.12 |
| 2010/0208818 A1* | 8/2010 | Yin | H04N 19/176 375/240.15 |
| 2010/0290527 A1* | 11/2010 | Park | H04N 19/176 375/240.13 |
| 2011/0026594 A1* | 2/2011 | Jung | H04N 7/34 375/240.12 |
| 2011/0038413 A1* | 2/2011 | Chen | H04N 19/105 375/240.12 |
| 2011/0069237 A1* | 3/2011 | Wang | H04N 5/145 348/699 |
| 2011/0142135 A1* | 6/2011 | Budagavi | H04N 19/147 375/240.17 |
| 2011/0150089 A1* | 6/2011 | Chujoh | H04N 19/105 375/240.14 |
| 2011/0188576 A1* | 8/2011 | Clerckx | H04N 19/51 375/240.16 |
| 2011/0194613 A1* | 8/2011 | Chen | H04N 19/176 375/240.24 |
| 2011/0206123 A1* | 8/2011 | Panchal | H04N 19/70 375/240.15 |
| 2013/0089265 A1* | 4/2013 | Yie | G06T 9/004 382/238 |
| 2013/0114727 A1* | 5/2013 | Sato | H04N 19/00696 375/240.16 |
| 2013/0129237 A1* | 5/2013 | Yie | G06T 9/004 382/233 |
| 2013/0177079 A1* | 7/2013 | Kim | H04N 19/00569 375/240.12 |
| 2014/0294066 A1* | 10/2014 | Kondo | H04N 19/00218 375/240.02 |
| 2015/0312588 A1 | 10/2015 | Yamamoto et al. | |

FOREIGN PATENT DOCUMENTS

| | | |
|---|---|---|
| KR | 10-0944333 B1 | 3/2010 |
| KR | 10-2011-0061468 A | 6/2011 |
| KR | 10-2011-0061509 A | 6/2011 |
| WO | 2006/006609 A1 | 1/2006 |
| WO | 2006082690 A1 | 8/2006 |
| WO | 2010039731 A2 | 4/2010 |
| WO | 2011103482 A1 | 8/2011 |
| WO | 2012017858 A1 | 2/2012 |
| WO | 2013047811 A1 | 4/2013 |
| WO | 2013065570 A1 | 5/2013 |
| WO | 2013069095 A1 | 5/2013 |

OTHER PUBLICATIONS

Alexander (Sandy) MacInnis., "Complexity Limitations for High Definition", Joint Video Team (JVT) of ISO/IEC MPEG & ITU-T VCEG (ISO/IEC JTC1/SC29/WG11 and ITU-T SG16 Q.6), 4th Meeting: Klagenfurt, Austria, Jul. 22-26, 2002, JVT-D134r1, pp. 1-3.

Jeongyeon Lim et al., "Description of video coding technology proposal by SK telecom, Sejong Univ. and Sungkyunkwan Univ.", Joint Collaborative Team on Video Coding (JCT-VC) of ITU-T SG16 WP3 and ISO/IEC JTC1/SC29/WG11, 1st Meeting: Dresden, DE, Apr. 15-23, 2010, JCTVC-A113, pp. 1-8.

Kemal Ugur et al., "CE3: Interpolation filter with shorter tap-length for small PU's", Joint Collaborative Team on Video Coding (JCT-VC) of ITU-T SG16 WP3 and ISO/IEC JTC1/SC29/WG11, 6th Meeting: Torino, Jul. 15-22, 2011, JCTVC-F248r2, pp. 1-5.

Teruhiko Suzuki, "Study of memory bandwidth of HEVC Motion Compensation", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F487_r1, pp. 1-3.

Kenji Kondo and Teruhiko Suzuki, "Non-CE3: Report on a restriction for small block", Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G392_r1, pp. 1-8.

Takeshi Chujoh and Tomoo Yamakage, "Non-CE3: A restriction of motion vector for small block size", Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G0770_r3, pp. 1-4.

Elena Alshina et al.,"CE3: The worst case memory band-width reduction by 2D->1D interpolation replacement (from Samsung).", Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G780, pp. 1-8.

International Search Report (PCT/ISA/210), dated Feb. 15, 2013, issued by the International Searching Authority in counterpart International Patent Application No. PCT/KR2012/007389.

Written Opinion (PCT/ISA/237), dated Feb. 15, 2013, issued by the International Searching Authority in counterpart International Patent Application No. PCT/KR2012/007389.

(56) References Cited

OTHER PUBLICATIONS

Communication dated Jan. 9, 2015 issued by the European Patent Office in counterpart European Patent Application No. 12831777.3.
Communication dated Jan. 13, 2015 issued by the Japanese Patent Office in counterpart Japanese Patent Application No. 2014-530597.
Tomohiro Ikai; "Bi-prediction restriction in small PU"; Joint Collaborative Team on Video Coding (JCT-VC); 7th Meeting: Geneva, CH; Nov. 2011; 5 pages total; XP030110291, Cited in EP Comm. Jan. 9, 2015 in 12831777.3.
Kenji Kondo et al.; "AHG7: Modification of merge candidate derivation to reduce MC memory bandwidth"; Joint Collaborative Team on Video Coding (JCT-VC); 8th Meeting: San Jose, CA, USA; Feb. 2012; 9 pages total, Cited in JP Comm. Jan. 13, 2015 in 2014-530597.
Communication dated Feb. 18, 2016, issued by the Korean Intellectual Property Office in corresponding Korean Application No. 10-2012-0102405.
Minhua Zhou., "AHG7: Disallow bi-predictive mode for 8x4 and 4x8 inter PUs", Joint Collaborative Team on Video Coding (JCT-VC) of ITU-T SG16 WP3 and ISO/IEC JTC1/SC29/WG11, 10th Meeting: Stockholm, Sweden, Jul. 11-20, 2012, Document: JCTVC-J0086M25408, (4 Pages Total).
Communication dated Mar. 1, 2016, from the Japanese Patent Office in counterpart application No. 2014-530597.
Teruhiko Suzuki et al., "Description of video coding technology proposal by Sony", Joint Collaborative Team on Video Coding (JCT-VC) of ITU-T SG16 WP3 and ISO/IEC JTC1/SC29/WG11, 1st Meeting: Dresden, DE, Apr. 15-23, 2010, Document: JCTVC-A103, (7 pages Total).
Communication dated Jul. 12, 2016, from the Japanese Patent Office in counterpart Application No. 2014-530597.
Jian Lou et al., "CE3: Report on Motorola Mobility's interpolation filter for HEVC", Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E358 WG11 No. m19887, (5 Pages Total).
A.Alshin et al., "CE3: DCT derived interpolation filter test by Samsung.", Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F247, (11 Pages Total).
Jian Lou et al., "CE3: Fixed interpolation filter tests by Motorola Mobility", Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F574, (11 Pages Total).
Communication dated Jul. 20, 2016, issued by the Korean Intellectual Property Office in corresponding Korean Application No. 10-2016-0085505.
Communication dated Jul. 20, 2016, issued by the Korean Intellectual Property Office in corresponding Korean Application No. 10-2016-0085506.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F803, (222 Pages Total).
Communication dated Aug. 3, 2016, from the State Intellectual Property Office of People's Republic of China in counterpart Application No. 201280055956.0.

* cited by examiner

CODING UNIT (1010)

PREDICTION UNIT (1060)

| BLOCK SIZE | | Uni-prediction | | | Bi-prediction | | | | |
|---|---|---|---|---|---|---|---|---|---|
| | | I | 1D | 2D | I-I | 1D-1D | 2D-2D | I-1D | I-2D | 1D-2D |
| 2 | 2 | 1 | 4.50 | 20.25 | 2 | 9.00 | 40.50 | 5.50 | 21.25 | 24.75 |
| 2 | 4 | 1 | 4.50 | 12.38 | 2 | 9.00 | 24.75 | 5.50 | 13.38 | 16.88 |
| 4 | 4 | 1 | 2.75 | 7.56 | 2 | 5.50 | 15.13 | 3.75 | 8.56 | 10.31 |
| 4 | 8 | 1 | 2.75 | 5.16 | 2 | 5.50 | 10.31 | 3.75 | 6.16 | 7.91 |
| 8 | 8 | 1 | 1.88 | 3.52 | 2 | 3.75 | 7.03 | 2.88 | 4.52 | 5.39 |
| 8 | 16 | 1 | 1.88 | 2.70 | 2 | 3.75 | 5.39 | 2.88 | 3.07 | 4.57 |
| 16 | 16 | 1 | 1.44 | 2.07 | 2 | 2.88 | 4.13 | 2.44 | 3.07 | 3.50 |
| 16 | 32 | 1 | 1.44 | 1.75 | 2 | 2.88 | 3.50 | 2.44 | 2.75 | 3.19 |
| 32 | 32 | 1 | 1.22 | 1.49 | 2 | 2.44 | 2.97 | 2.22 | 2.49 | 2.70 |
| 32 | 64 | 1 | 1.22 | 1.35 | 2 | 2.44 | 2.70 | 2.22 | 2.35 | 2.57 |
| 64 | 64 | 1 | 1.11 | 1.23 | 2 | 2.22 | 2.46 | 2.11 | 2.23 | 2.34 |

| BLOCK SIZE | | Uni-prediction | | | Bi-prediction | | | | |
|---|---|---|---|---|---|---|---|---|---|
| | | I | 1D | 2D | I-I | 1D-1D | 2D-2D | I-1D | I-2D | 1D-2D |
| 2 | 2 | 1 | 4.00 | 16.00 | 2 | 8.00 | 32.00 | 5.00 | 17.00 | 20.00 |
| 2 | 4 | 1 | 4.00 | 10.00 | 2 | 8.00 | 20.00 | 5.00 | 11.00 | 14.00 |
| 4 | 4 | 1 | 2.50 | 6.25 | 2 | 5.00 | 12.50 | 3.50 | 7.25 | 8.75 |
| 4 | 8 | 1 | 2.50 | 4.38 | 2 | 5.00 | 8.75 | 3.50 | 5.38 | 6.88 |
| 8 | 8 | 1 | 1.75 | 3.06 | 2 | 3.50 | 6.13 | 2.75 | 4.06 | 4.81 |
| 8 | 16 | 1 | 1.75 | 2.41 | 2 | 3.50 | 4.81 | 2.75 | 3.41 | 4.16 |
| 16 | 16 | 1 | 1.38 | 1.89 | 2 | 2.75 | 3.78 | 2.38 | 2.89 | 3.27 |
| 16 | 32 | 1 | 1.38 | 1.63 | 2 | 2.75 | 3.27 | 2.38 | 2.63 | 3.01 |
| 32 | 32 | 1 | 1.19 | 1.41 | 2 | 2.38 | 2.82 | 2.19 | 2.41 | 2.60 |
| 32 | 64 | 1 | 1.19 | 1.30 | 2 | 2.38 | 2.60 | 2.19 | 2.30 | 2.49 |
| 64 | 64 | 1 | 1.09 | 1.20 | 2 | 2.19 | 2.39 | 2.09 | 2.20 | 2.29 |

| BLOCK SIZE | | Uni-prediction | | | Bi-prediction | | | | |
|---|---|---|---|---|---|---|---|---|---|
| | | I | 1D | 2D | I-I | 1D-1D | 2D-2D | I-1D | I-2D | 1D-2D |
| 2 | 2 | 1 | 3.50 | 12.25 | 2 | 7.00 | 24.50 | 4.50 | 13.25 | 15.75 |
| 2 | 4 | 1 | 3.50 | 7.88 | 2 | 7.00 | 15.75 | 4.50 | 8.88 | 11.38 |
| 4 | 4 | 1 | 2.25 | 5.06 | 2 | 4.50 | 10.13 | 3.25 | 6.06 | 7.31 |
| 4 | 8 | 1 | 2.25 | 3.66 | 2 | 4.50 | 7.31 | 3.25 | 4.66 | 5.91 |
| 8 | 8 | 1 | 1.63 | 2.64 | 2 | 3.25 | 5.28 | 2.63 | 3.64 | 4.27 |
| 8 | 16 | 1 | 1.63 | 2.13 | 2 | 3.25 | 4.27 | 2.63 | 3.13 | 3.76 |
| 16 | 16 | 1 | 1.31 | 1.72 | 2 | 2.63 | 3.45 | 2.31 | 2.72 | 3.04 |
| 16 | 32 | 1 | 1.31 | 1.52 | 2 | 2.63 | 3.04 | 2.31 | 2.52 | 2.83 |
| 32 | 32 | 1 | 1.16 | 1.34 | 2 | 2.31 | 2.67 | 2.16 | 2.34 | 2.49 |
| 32 | 64 | 1 | 1.16 | 1.25 | 2 | 2.31 | 2.49 | 2.16 | 2.25 | 2.40 |

| BLOCK SIZE | | Uni-prediction | | Bi-prediction | | | | | |
|---|---|---|---|---|---|---|---|---|---|
| | | I | 1D | 2D | I-I | 1D-1D | 2D-2D | I-1D | I-2D | 1D-2D |
| 2 | 2 | 1 | 3.00 | 9.00 | 2 | 6.00 | 18.00 | 4.00 | 10.00 | 12.00 |
| 2 | 4 | 1 | 3.00 | 6.00 | 2 | 6.00 | 12.00 | 4.00 | 7.00 | 9.00 |
| 4 | 4 | 1 | 2.00 | 4.00 | 2 | 4.00 | 8.00 | 3.00 | 5.00 | 6.00 |
| 4 | 8 | 1 | 2.00 | 3.00 | 2 | 4.00 | 6.00 | 3.00 | 4.00 | 5.00 |
| 8 | 8 | 1 | 1.50 | 2.25 | 2 | 3.00 | 4.50 | 2.50 | 3.25 | 3.75 |
| 8 | 16 | 1 | 1.50 | 1.88 | 2 | 3.00 | 3.75 | 2.50 | 2.88 | 3.38 |
| 16 | 16 | 1 | 1.25 | 1.56 | 2 | 2.50 | 3.13 | 2.25 | 2.56 | 2.81 |
| 16 | 32 | 1 | 1.25 | 1.41 | 2 | 2.50 | 2.81 | 2.25 | 2.41 | 2.66 |
| 32 | 32 | 1 | 1.13 | 1.27 | 2 | 2.25 | 2.53 | 2.13 | 2.27 | 2.39 |
| 32 | 64 | 1 | 1.13 | 1.20 | 2 | 2.25 | 2.39 | 2.13 | 2.20 | 2.32 |
| 64 | 64 | 1 | 1.06 | 1.13 | 2 | 2.13 | 2.26 | 2.06 | 2.13 | 2.19 |

| BLOCK SIZE | | Uni-prediction | | | Bi-prediction | | | | | |
|---|---|---|---|---|---|---|---|---|---|---|
| | | I | 1D | 2D | I-I | 1D-1D | 2D-2D | I-1D | I-2D | 1D-2D |
| 2 | 2 | 1 | 2.50 | 6.25 | 2 | 5.00 | 12.50 | 3.50 | 7.25 | 8.75 |
| 2 | 4 | 1 | 2.50 | 4.38 | 2 | 5.00 | 8.75 | 3.50 | 5.38 | 6.88 |
| 4 | 4 | 1 | 1.75 | 3.06 | 2 | 3.50 | 6.13 | 2.75 | 4.06 | 4.81 |
| 4 | 8 | 1 | 1.75 | 2.41 | 2 | 3.50 | 4.81 | 2.75 | 3.41 | 4.16 |
| 8 | 8 | 1 | 1.38 | 1.89 | 2 | 2.75 | 3.78 | 2.38 | 2.63 | 3.27 |
| 8 | 16 | 1 | 1.38 | 1.63 | 2 | 2.75 | 3.27 | 2.38 | 2.41 | 3.01 |
| 16 | 16 | 1 | 1.19 | 1.41 | 2 | 2.38 | 2.82 | 2.19 | 2.30 | 2.60 |
| 16 | 32 | 1 | 1.19 | 1.30 | 2 | 2.38 | 2.60 | 2.19 | 2.30 | 2.49 |
| 32 | 32 | 1 | 1.09 | 1.20 | 2 | 2.19 | 2.39 | 2.09 | 2.20 | 2.29 |
| 32 | 64 | 1 | 1.09 | 1.15 | 2 | 2.19 | 2.29 | 2.09 | 2.15 | 2.24 |
| 64 | 64 | 1 | 1.05 | 1.10 | 2 | 2.09 | 2.19 | 2.05 | 2.10 | 2.14 |

| BLOCK SIZE | | Uni-prediction | | | Bi-prediction | | | | | |
|---|---|---|---|---|---|---|---|---|---|---|
| | | I | 1D | 2D | I-I | 1D-1D | 2D-2D | I-1D | I-2D | 1D-2D |
| 2 | 2 | 1 | 2.00 | 4.00 | 2 | 4.00 | 8.00 | 3.00 | 5.00 | 6.00 |
| 2 | 4 | 1 | 2.00 | 3.00 | 2 | 4.00 | 6.00 | 3.00 | 4.00 | 5.00 |
| 4 | 4 | 1 | 1.50 | 2.25 | 2 | 3.00 | 4.50 | 2.50 | 3.25 | 3.75 |
| 4 | 8 | 1 | 1.50 | 1.88 | 2 | 3.00 | 3.75 | 2.50 | 2.88 | 3.38 |
| 8 | 8 | 1 | 1.25 | 1.56 | 2 | 2.50 | 3.13 | 2.25 | 2.56 | 2.81 |
| 8 | 16 | 1 | 1.25 | 1.41 | 2 | 2.50 | 2.81 | 2.25 | 2.41 | 2.66 |
| 16 | 16 | 1 | 1.13 | 1.27 | 2 | 2.25 | 2.53 | 2.13 | 2.27 | 2.39 |
| 16 | 32 | 1 | 1.13 | 1.20 | 2 | 2.25 | 2.39 | 2.13 | 2.20 | 2.32 |
| 32 | 32 | 1 | 1.06 | 1.13 | 2 | 2.13 | 2.26 | 2.06 | 2.13 | 2.19 |

| BLOCK SIZE | | Uni-prediction | | | Bi-prediction | | | | |
|---|---|---|---|---|---|---|---|---|---|
| | | I | 1D | 2D | I-I | 1D-1D | 2D-2D | I-1D | I-2D | 1D-2D |
| 2 | 2 | 1 | 1.50 | 2.25 | 2 | 3.00 | 4.50 | 2.50 | 3.25 | 3.75 |
| 2 | 4 | 1 | 1.50 | 1.88 | 2 | 3.00 | 3.75 | 2.50 | 2.88 | 3.38 |
| 4 | 4 | 1 | 1.25 | 1.56 | 2 | 2.50 | 3.13 | 2.25 | 2.56 | 2.81 |
| 4 | 8 | 1 | 1.25 | 1.41 | 2 | 2.50 | 2.81 | 2.25 | 2.41 | 2.66 |
| 8 | 8 | 1 | 1.13 | 1.27 | 2 | 2.25 | 2.53 | 2.13 | 2.27 | 2.39 |
| 8 | 16 | 1 | 1.13 | 1.20 | 2 | 2.25 | 2.39 | 2.13 | 2.20 | 2.32 |
| 16 | 16 | 1 | 1.06 | 1.13 | 2 | 2.13 | 2.26 | 2.06 | 2.13 | 2.19 |
| 16 | 32 | 1 | 1.06 | 1.10 | 2 | 2.13 | 2.19 | 2.06 | 2.10 | 2.16 |
| 32 | 32 | 1 | 1.03 | 1.06 | 2 | 2.06 | 2.13 | 2.03 | 2.06 | 2.09 |
| 32 | 64 | 1 | 1.03 | 1.05 | 2 | 2.06 | 2.09 | 2.03 | 2.05 | 2.08 |
| 64 | 64 | 1 | 1.02 | 1.03 | 2 | 2.03 | 2.06 | 2.02 | 2.03 | 2.05 |

FIG. 19

N=8 (for Luma), N=4 (for chroma)

| # | Color Comp | Size | Uni/Bi | MV position | Pixels to read from memory per 1 pixel MC |
|---|---|---|---|---|---|
| 1 | Luma | 4x8 | bi | 2D-2D | 10.31 |
| 2 | Chroma | 2x4 | bi | 2D-2D | 8.75 |
| 3 | Luma | 4x8 | bi | 1D-2D | 7.91 |
| 4 | Luma | 8x8 | bi | 2D-2D | 7.03 |
| 5 | Chroma | 2x4 | bi | 1D-2D | 6.88 |
| 6 | Luma | 4x8 | bi | 1-2D | 6.16 |
| 7 | Chroma | 4x4 | bi | 2D-2D | 6.13 |
| 8 | Luma | 4x8 | bi | 1D-1D | 5.50 |
| 9 | Luma | 8x16 8x8 | bi | 2D-2D 1D-2D | 5.39 |
| 10 | Chroma | 2x4 | bi | 1-2D | 5.38 |
| 11 | Luma | 8x8 | uni | 2D-2D | 5.16 |
| 12 | ... | ... | ... | ... | ... |

FIG. 20

N=8 (for Luma), N=4 (for chroma)

| # | Color Comp | Size | Uni/Bi | MV position | Pixels to read from memory per 1 pixel MC |
|---|---|---|---|---|---|
| 1 | Luma | 4x4 | bi | 2D-2D | 15.31 |
| 2 | Chroma | 2x2 | bi | 2D-2D | 12.50 |
| 3 | Luma | 4x4<br>4x8 | bi | 1D-2D<br>2D-2D | 10.31 |
| 4 | Chroma | 2x2<br>2x4 | bi | 1D-2D<br>2D-2D | 8.75 |
| 5 | Luma | 4x4 | bi | 1D-2D | 8.56 |
| 6 | Luma | 4x8 | bi | 1D-2D | 7.91 |
| 7 | Luma | 4x4 | uni | 2D | 7.56 |
| 8 | Chroma | 2x2 | bi | 1-2D | 7.25 |
| 9 | Luma | 8x8 | bi | 2D-2D | 7.03 |
| 10 | Chroma | 2x4 | bi | 1D-2D | 6.88 |
| 11 | Chroma | 2x2 | uni | 2D | 6.25 |
| 12 | Luma | 4x8 | bi | 1-2D | 6.16 |
| 13 | Chroma | 4x4 | bi | 2D-2D | 6.13 |
| 14 | Luma | 4x8 | bi | 1D-1D | 5.50 |
| 15 | Luma | 8x16<br>8x8 | bi | 2D-2D<br>1D-2D | 3.39 |
| 16 | Chroma | 2x4 | bi | 1-2D | 5.38 |
| 17 | Luma | 8x8 | uni | 2D | 5.16 |
| 18 | ... | ... | ... | ... | ... |

FIG. 24

| # | Color Comp | Size | Uni/Bi | MV position | Original | A | B |
|---|---|---|---|---|---|---|---|
| 1 | Luma | 4x8 | bi | 2D-2D | 10.31 | 4.81 | 5.50 |
| 2 | Chroma | 2x4 | bi | 2D-2D | 8.75 | 3.75 | 5.00 |
| 3 | Luma | 4x8 | bi | 1D-2D | 7.91 | 4.16 | 5.50 |
| 4 | Luma | 8x8 | bi | 2D-2D | 7.03 | 3.78 | 3.75 |
| 5 | Chroma | 2x4 | bi | 1D-2D | 6.88 | 3.38 | 5.00 |
| 6 | Luma | 4x8 | bi | 1-2D | 6.16 | 3.41 | 3.75 |
| 7 | Chroma | 4x4 | bi | 2D-2D | 6.13 | 3.13 | 3.50 |
| 8 | Luma | 4x8 | bi | 1D-1D | 5.50 | 3.50 | 5.50 |
| 9 | Luma | 8x16 8x8 | bi | 2D-2D 1D-2D | 5.39 | 3.27 | 3.75 |
| 10 | Chroma | 2x4 | bi | 1-2D | 5.38 | 2.88 | 3.50 |
| 11 | Luma | 8x8 | uni | 2D-2D | 5.16 | 2.41 | 2.75 |
| 12 | ... | ... | ... | ... | ... | | |

FIG. 25

| # | Color Comp | Size | Uni/Bi | MV position | Original | A | B |
|---|---|---|---|---|---|---|---|
| 1 | Luma | 4x4 | bi | 2D-2D | 15.31 | 6.13 | 5.50 |
| 2 | Chroma | 2x2 | bi | 2D-2D | 12.50 | 4.50 | 5.00 |
| 3 | Luma | 4x4 4x8 | bi | 1D-2D 2D-2D | 10.31 | 4.81 | 5.50 |
| 4 | Chroma | 2x2 2x4 | bi | 1D-2D 2D-2D | 8.75 | 3.75 | 5.00 |
| 5 | Luma | 4x4 | bi | 1-2D | 8.56 | 4.06 | 3.75 |
| 6 | Luma | 4x8 | bi | 1D-2D | 7.01 | 4.16 | 5.50 |
| 7 | Luma | 4x4 | uni | 2D | 7.56 | 3.06 | 2.75 |
| 8 | Chroma | 2x2 | bi | 1-2D | 7.25 | 3.25 | 3.50 |
| 9 | Luma | 8x8 | bi | 2D-2D | 7.03 | 3.78 | 3.75 |
| 10 | Chroma | 2x4 | bi | 1D-2D | 6.88 | 3.38 | 5.00 |
| 11 | Chroma | 2x2 | uni | 2D | 6.25 | 1.50 | 2.50 |
| 12 | Luma | 4x8 | bi | 1-2D | 6.16 | 3.41 | 3.75 |
| 13 | Chroma | 4x4 | bi | 2D-2D | 6.13 | 3.13 | 3.50 |
| 14 | Luma | 4x8 | bi | 1D-1D | 5.50 | 3.50 | 5.50 |

METHOD AND DEVICE FOR ENCODING AND DECODING VIDEO

CROSS-REFERENCE TO RELATED APPLICATIONS

This application is a Continuation application of U.S. application Ser. No. 14/345,098 filed Apr. 15, 2014, which is a National Stage of International Application No. PCT/KR2012/007389, filed on Sep. 14, 2012, and claims the benefit of U.S. Provisional Patent Application No. 61/534,499, filed on Sep. 14, 2011, the disclosures of which are incorporated herein in their entirety by reference.

BACKGROUND

1. Field

Apparatuses and methods consistent with exemplary embodiments relate to video encoding and decoding, and more particularly, to a method and apparatus for encoding and decoding a video to reduce memory access for reading out data of a reference frame during motion compensation.

2. Description of the Related Art

In order to encode a video, one picture is split into predetermined data units such as macroblocks. Each of the macroblocks is prediction-encoded by using inter prediction or intra prediction.

Inter prediction which is a method of compressing an image by removing temporal redundancy between pictures uses motion estimation and motion compensation. The motion estimation predicts blocks of a current picture by using at least one reference picture. The motion estimation and the motion compensation are processes of searching for a reference block which is most similar to a current block in a predetermined search range by using a predetermined evaluation function and reading out data of the reference block which is most similar to the current block. In order to more accurately perform the motion estimation and the motion compensation, subpixels between integer pixels are generated by performing interpolation in the predetermined search range of the reference picture, and the motion estimation and the motion compensation are performed based on the reference picture having subpixel precision. In order to perform the motion estimation and the motion compensation at the subpixel precision, a process of interpolating data of the reference picture is needed.

In the related art, interpolation is performed by using a finite impulse response (FIR) filter having a predetermined tap number. An N-tap FIR filter interpolates a subpixel by using N neighboring integer pixels. In order to interpolate one subpixel in a process of performing interpolation by using an N-tap FIR filter, N reference pixels need to be read out from a memory. If both a horizontal component and a vertical component of a motion vector have a subpixel precision, since a two-dimensional (2D) interpolation process needs to be performed in horizontal and vertical directions, the number of times memory access is performed increases. The number of times memory access is performed for bi-directional motion is two times greater than the number of times memory access is performed for uni-directional motion estimation because two reference pictures are used.

SUMMARY

The exemplary embodiments provide a method and apparatus for encoding and decoding a video which may reduce memory access for reading out reference data during motion estimation and motion compensation.

According to an aspect of an exemplary embodiment, there is provided a method of encoding a video, the method including: determining whether a unidirectional motion estimation mode and a bidirectional motion estimation mode are to be used to perform motion estimation and motion compensation of a current prediction unit to be encoded, the determining being based on a size of the current prediction unit; performing the motion estimation and the motion compensation on the current prediction unit by using at least one motion estimation mode from among the unidirectional motion estimation mode and the bidirectional motion estimation mode according to the determining of whether the unidirectional motion estimation mode and the bidirectional motion estimation mode are to be used; determining an optimum motion estimation mode of the current prediction unit based on an encoding cost of the current prediction unit which is obtained through the performing of the motion estimation and the motion compensation; and encoding information indicating the determined optimum motion estimation mode based on the size of the current prediction unit.

According to an aspect of another exemplary embodiment, there is provided an apparatus configured to encode a video, the apparatus including: a motion estimator and compensator configured to make a determination as to whether a unidirectional motion estimation mode and a bidirectional motion estimation mode are to be applied to perform motion estimation and motion compensation of a current prediction unit to be encoded, the determination being based on a size of the current prediction unit, and to perform motion estimation and the motion compensation on the current prediction unit by using at least one motion estimation mode from among the unidirectional motion estimation mode and the bidirectional motion estimation mode according to the determination as to whether the bidirectional motion estimation mode and the bidirectional motion estimation mode are to be used; a controller configured to determine an optimum motion estimation mode of the current prediction unit based on an encoding cost of the current prediction unit obtained through the motion estimation and the motion compensation; and an entropy encoder configured to encode information indicating the determined optimum motion estimation mode based on the size of the current prediction unit.

According to an aspect of another exemplary embodiment, there is provided an apparatus configured to decode a video, the apparatus including: an entropy decoder configured to obtain size information of a current prediction unit to be decoded from a bitstream and motion estimation mode information indicating a motion estimation mode applied to the current prediction unit; and a motion compensator configured to determine the motion estimation mode applied to the current prediction unit from among a unidirectional motion estimation mode and a bidirectional motion estimation mode based on a size of the current prediction unit indicated by the size information and the obtained motion estimation mode information, and to perform motion compensation on the current prediction unit by using the determined motion estimation mode.

Memory access for reading out data of a reference frame may be limited to a predetermined bandwidth by determining whether a unidirectional motion estimation mode and a bidirectional motion estimation mode are to be used based on a size of a prediction unit, and performing motion estimation and motion compensation by using the determined motion estimation mode(s).

BRIEF DESCRIPTION OF THE DRAWINGS

The above and other features and advantages of the exemplary embodiments will become more apparent by describing in detail exemplary embodiments thereof with reference to the attached drawings in which:

FIGS. 18A, 18B, 18C, 18D, 18E, 18F, and 18G are tables illustrating a number of pixels of a reference frame needed for motion compensation per pixel of a current prediction unit according to a size of a prediction unit, a prediction mode, and whether horizontal and vertical components of a motion vector of the prediction unit have integer values;

FIGS. 19 and 20 are tables illustrating in descending order beginning from a high value a number of pixels of a reference frame needed for motion compensation per pixel of a current prediction unit according to a size of a prediction unit of a luminance component, a size of a prediction unit of a chroma component, a prediction mode, and whether horizontal and vertical components of a motion vector of the prediction unit have integer values;

FIGS. 24 and 25 are tables illustrating in descending order beginning from a high value a number of pixels of a reference frame needed for motion compensation per pixel of a current prediction unit according to a size of a prediction unit of a luminance component, a size of a prediction unit of a chroma component, a motion estimation mode, and whether horizontal and vertical components of a motion vector of the prediction unit have integer values;

DETAILED DESCRIPTION OF THE EXEMPLARY EMBODIMENTS

Exemplary embodiments will now be described more fully with reference to the accompanying drawings.

Figure 1:
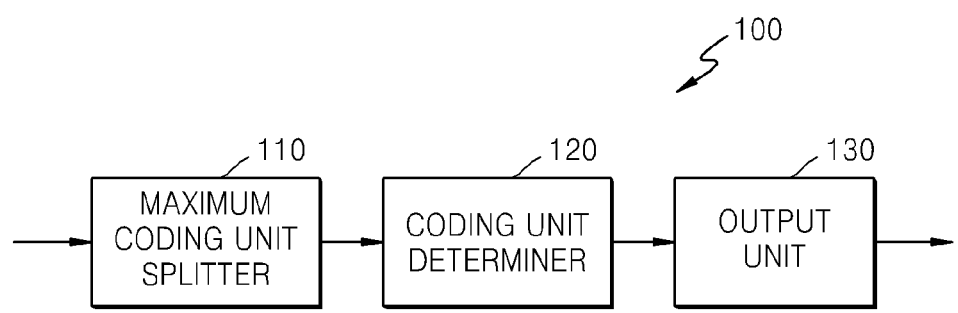
FIG. 1 is a block diagram of an apparatus for encoding a video, according to an exemplary embodiment.

FIG. 1 is a block diagram of a video encoding apparatus 100 according to an exemplary embodiment.

The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or smaller than the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to a same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split into regions according to the depths and the encoding errors may differ according to regions in the one maximum coding unit, and thus, the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A first maximum depth according to an exemplary embodiment may denote the total number of times splitting is performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation is performed on all of the deeper coding units which are generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, e.g., based on a coding unit that is no longer split into coding units corresponding to a lower depth. Hereinafter, the coding unit that is no longer split and becomes a basis unit for prediction encoding may also be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least (e.g., smallest) encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation may also be referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of times splitting is performed to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units having a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion (RD) Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus, the split information may be defined not to split the current coding unit to a lower depth. Alternatively, if the current depth of the current coding unit is not the coded depth, the encoding is performed on the coding unit of the lower depth, and thus, the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus, information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or a large data amount is encoded in a related art macroblock, a number of macroblocks per picture excessively increases. Accordingly, a number of pieces of compressed information generated for each macroblock increases, and thus, it is difficult to transmit the compressed information and data compression efficiency decreases. However, by using the video encoding apparatus 100, image compression efficiency may be increased since a coding unit is adjusted while considering characteristics of an image while increasing a maximum size of a coding unit and while considering a size of the image.

Figure 2:
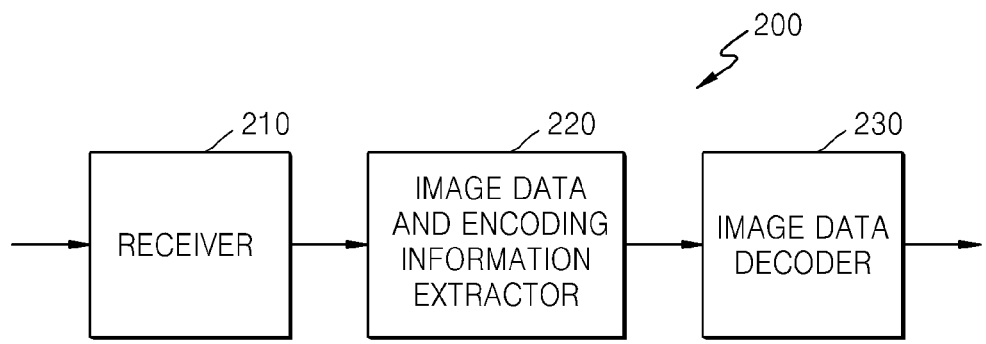
FIG. 2 is a block diagram of an apparatus for decoding a video, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200, may be identical to those terms described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header of the current picture.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include performing a prediction operation including intra prediction and motion compensation, and inverse transformation. Inverse transformation may be performed according to a method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of a coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment o, will now be described with reference to FIGS. 3 through 13.

Figure 3:
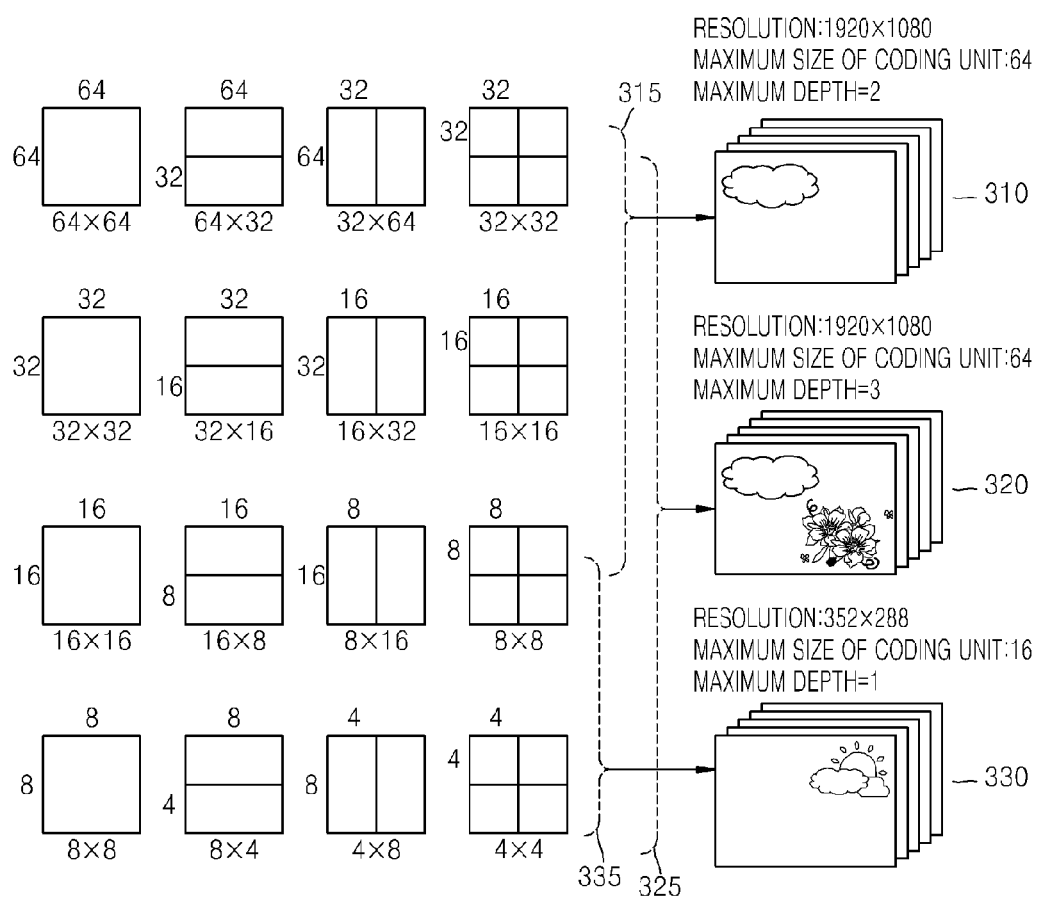
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be sufficiently large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64 and coding units having long axis sizes of 32, 16, and 8 since the depths are deepened to 3 layers by splitting the maximum coding unit three times. As a depth deepens, detailed information may be more precisely expressed.

Figure 4:
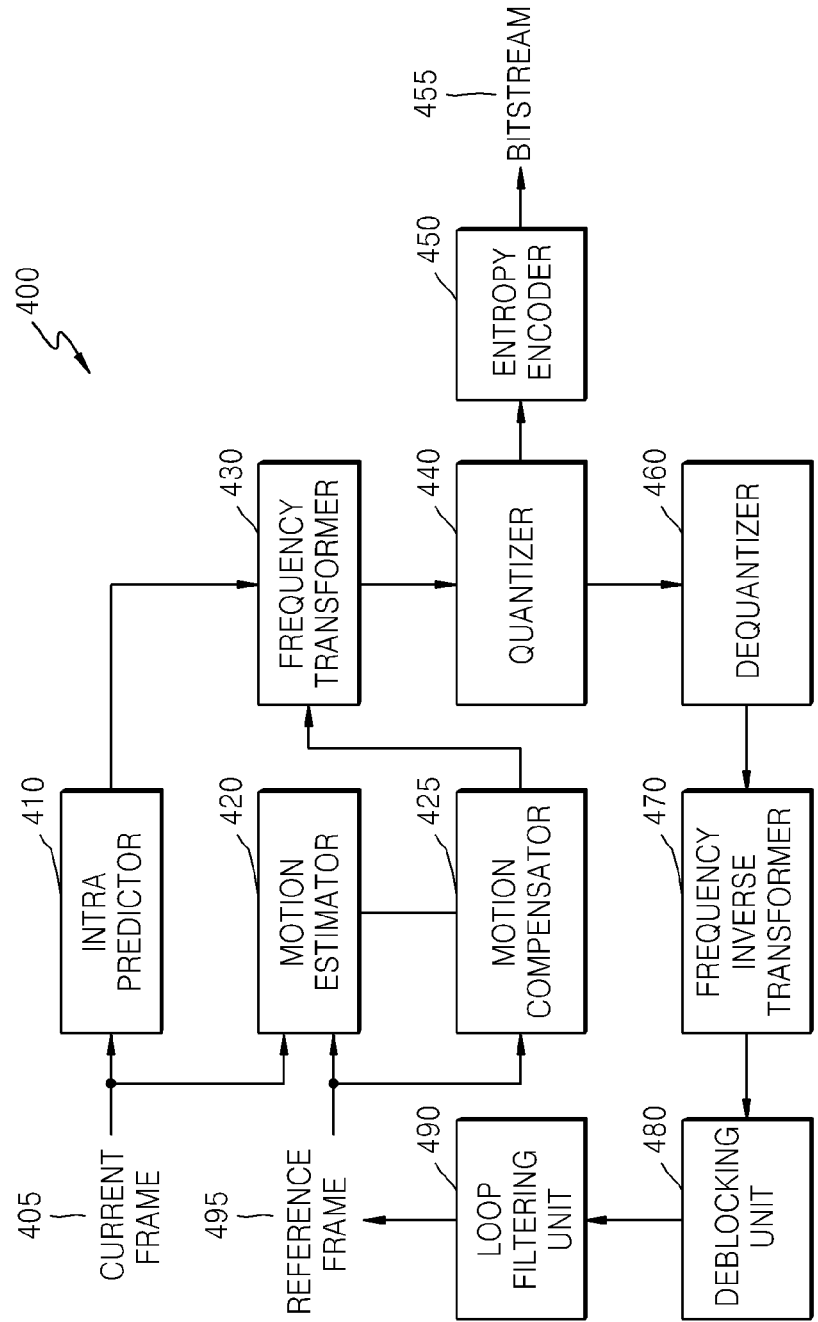
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a frequency transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, e.g., the intra predictor 410, the motion estimator 420, the motion compensator 425, the frequency transformer 430, the quantizer 440, the entropy encoder 450, the inverse quantizer 460, the frequency inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
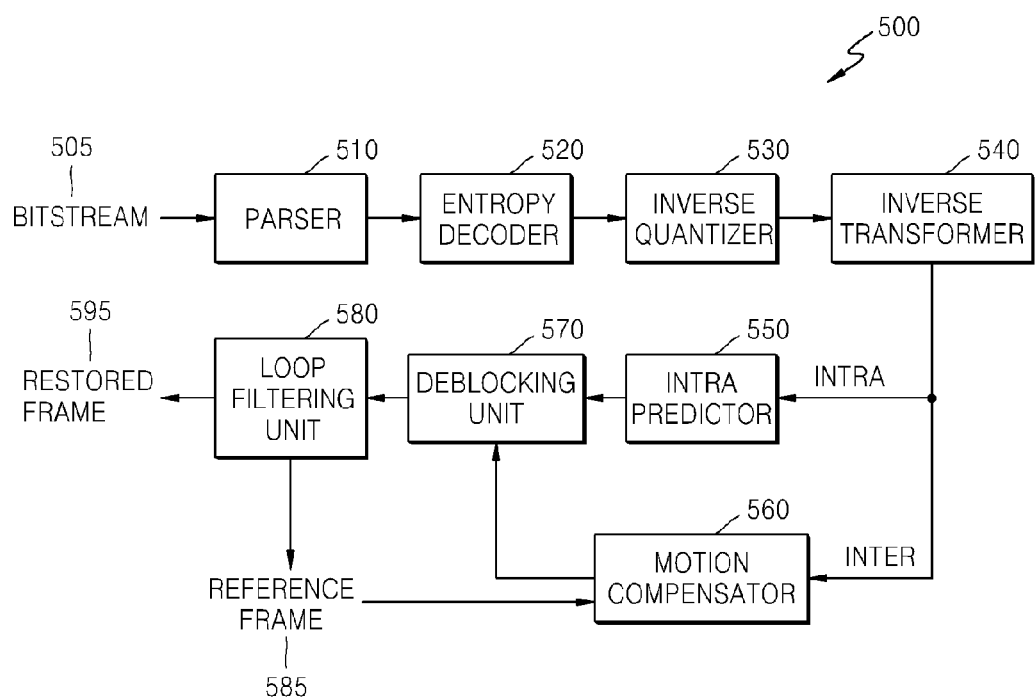
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data, which is post-processed through the deblocking unit 570 and the loop filtering unit 580, may be output as the reference frame 585.

In order to decode the image data in the image data decoder 230 of the video decoding apparatus 200, the image decoder 500 may perform operations that are performed after operations of the parser 510 are performed.

In order for the image decoder 500 to be applied in the video decoding apparatus 200, all elements of the image decoder 500, e.g., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 performs operations based on a size of a transformation unit for each coding unit.

Figure 6:
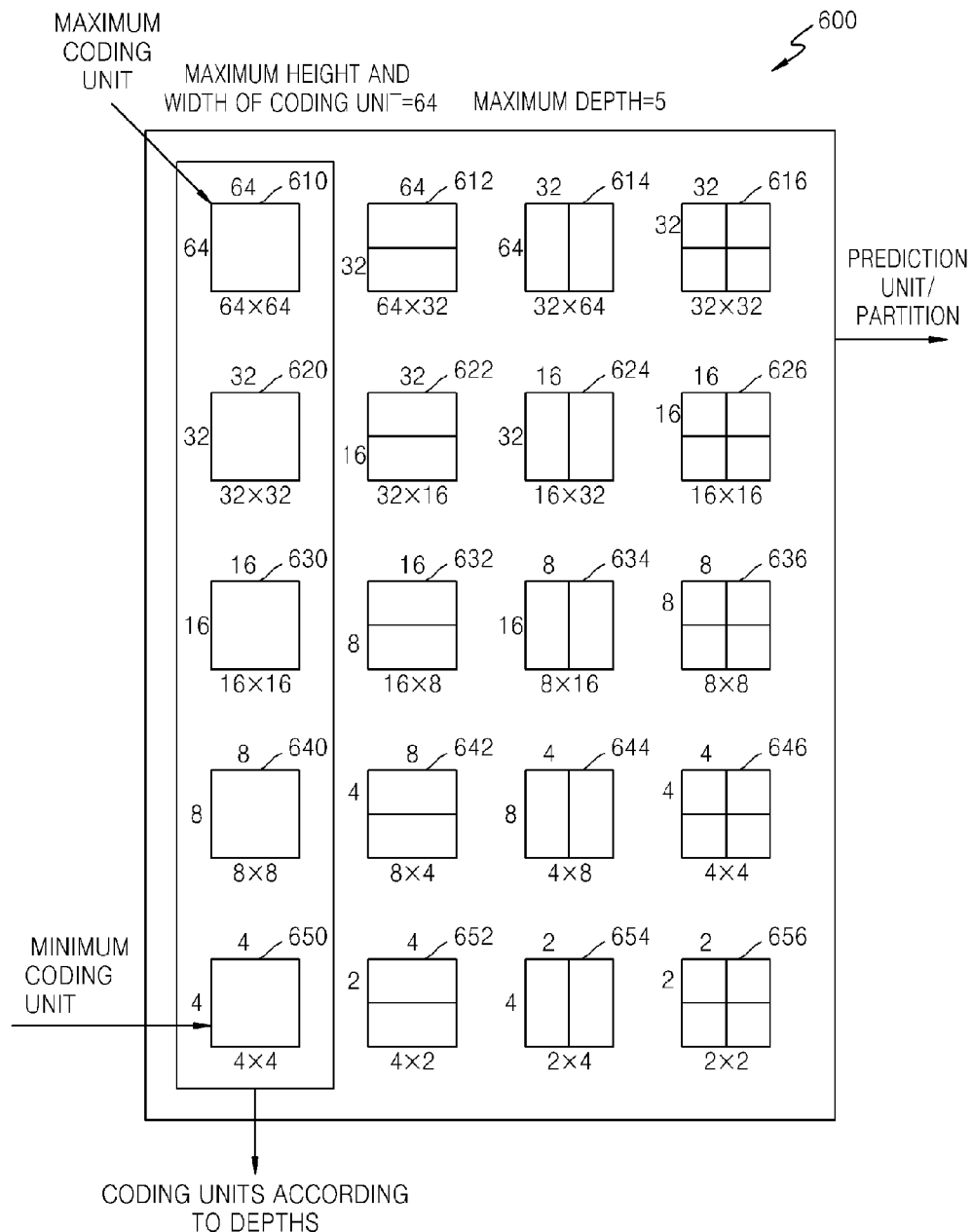
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, e.g., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the coding unit 610, e.g., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, e.g., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, e.g., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, e.g., a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths and performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
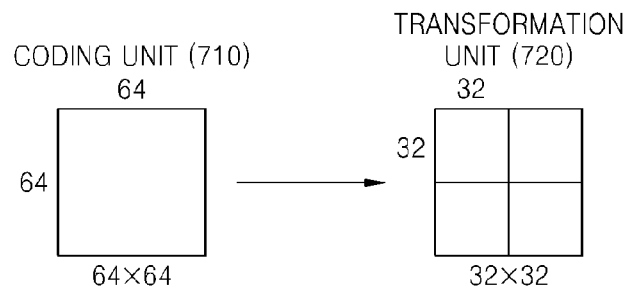
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

The video encoding apparatus 100 or video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
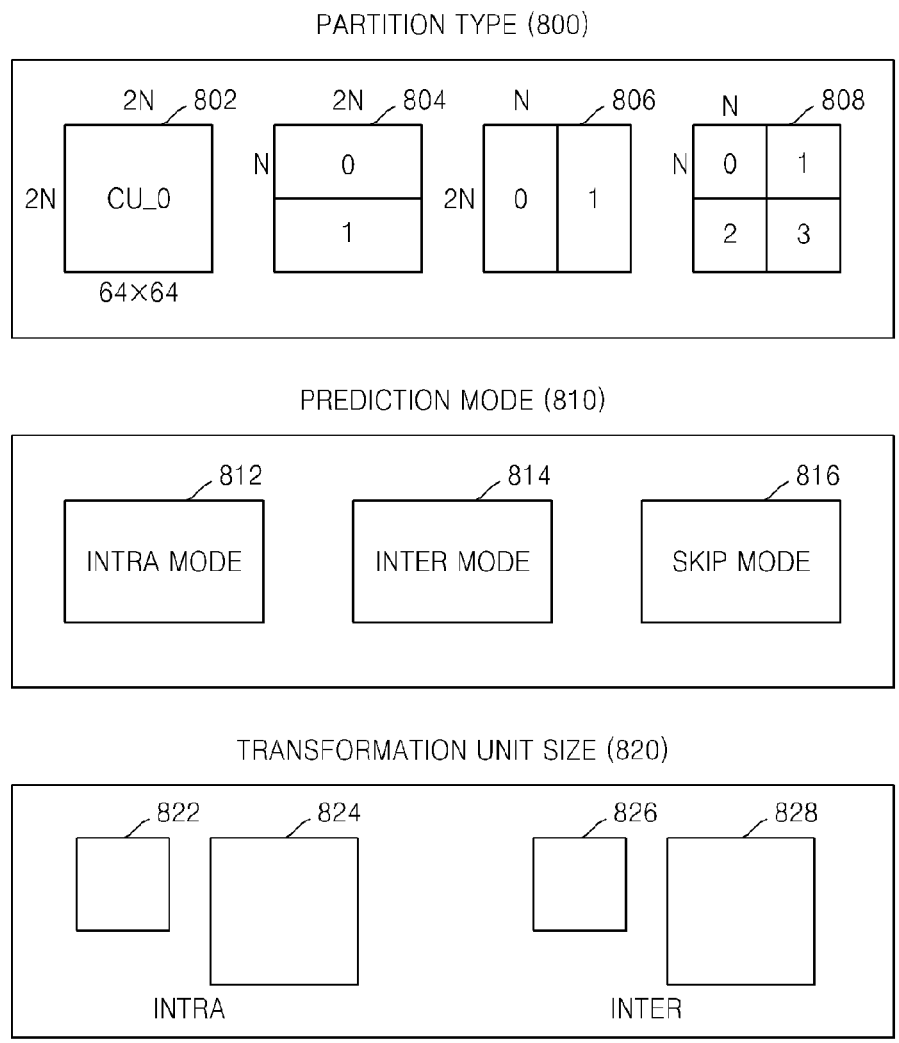
FIG. 8 is a diagram for describing encoding information of coding units corresponding to a coded depth, according to an exemplary embodiment.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, e.g., an intra mode 812, an inter mode 814, or a skip mode 816.

The information 820 indicates a transformation unit for transformation to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 9:
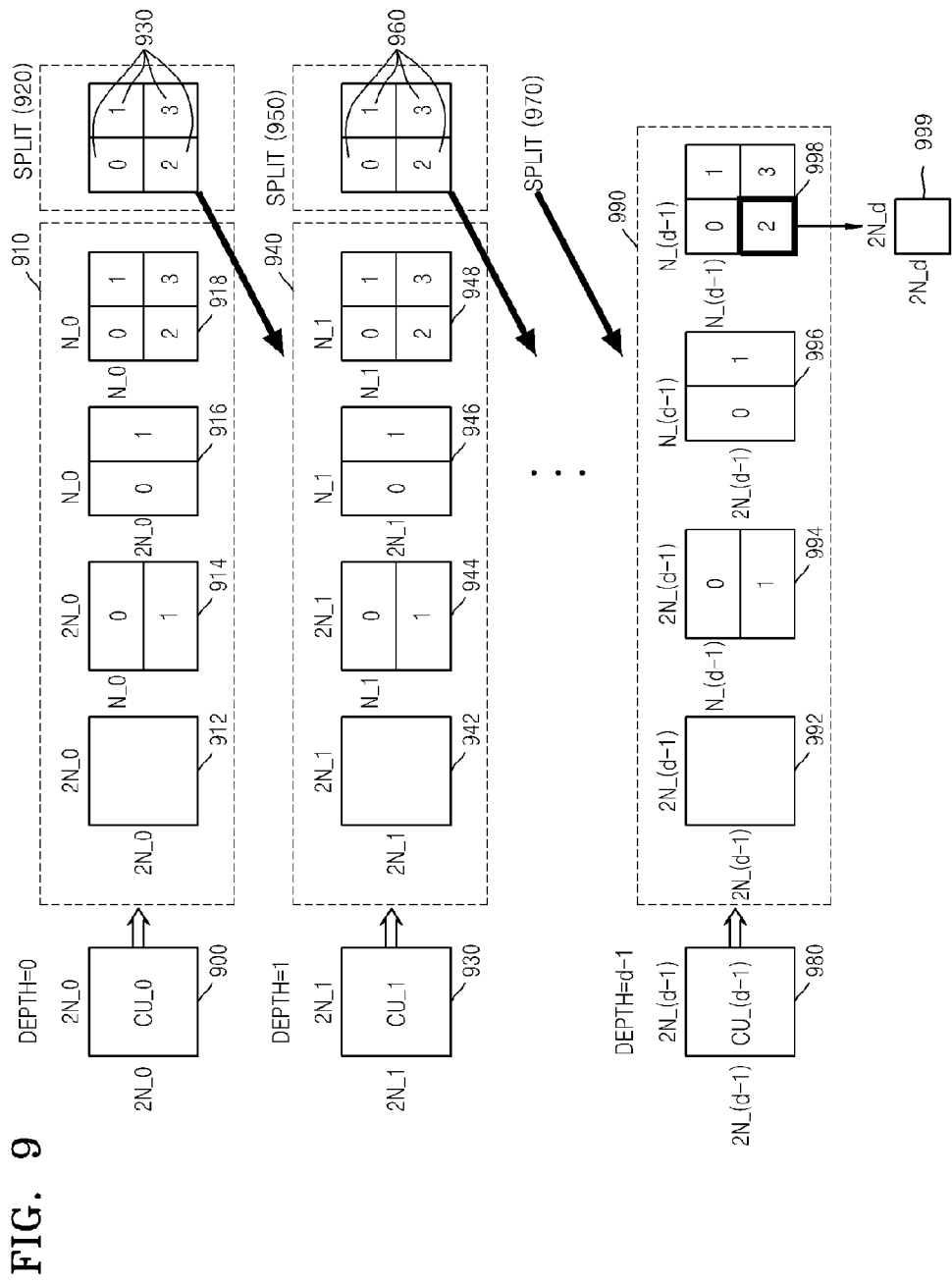
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d−1, and split information may be encoded up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
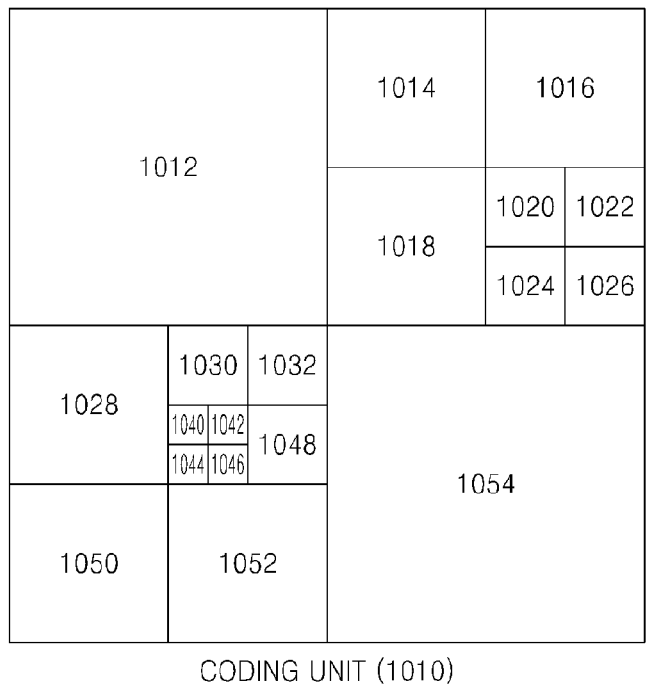
FIGS. 10, 11 and 12 are diagrams for describing a relationship between coding units, prediction units, and transformation units, according to an exemplary embodiment.
Figure 11:
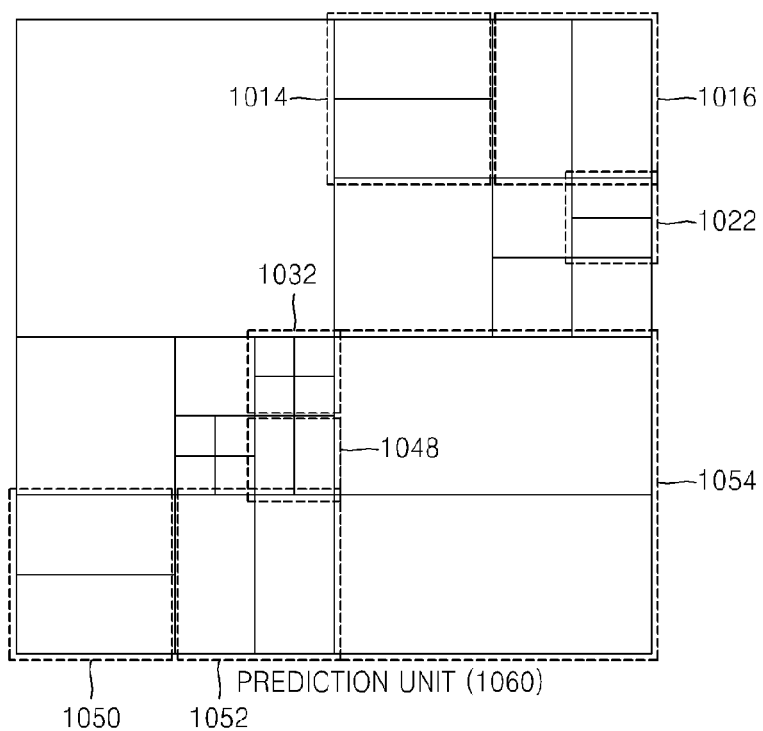
Figure 12:
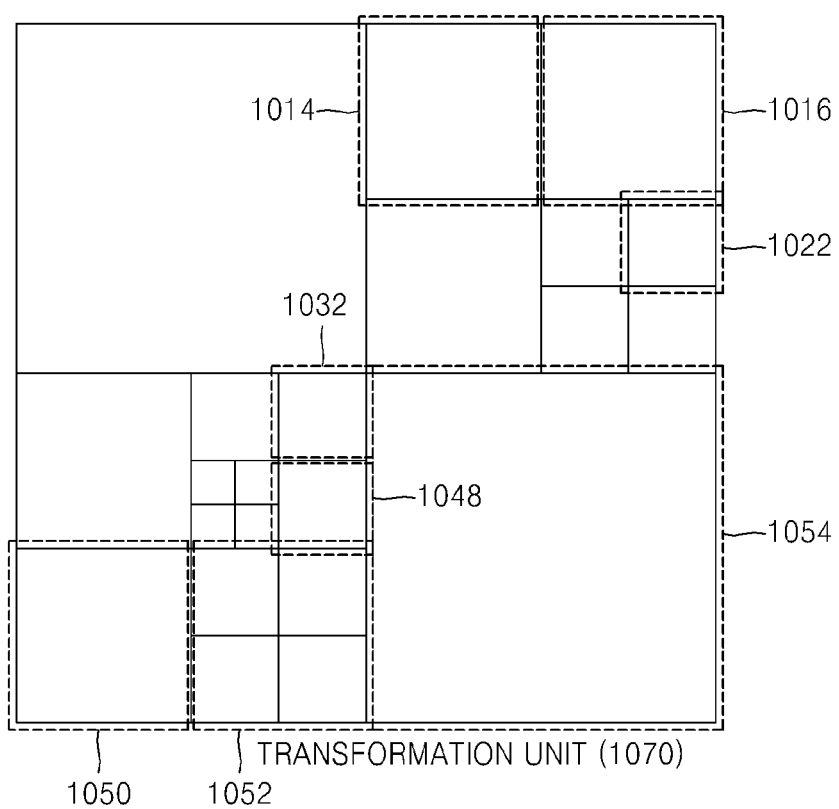

FIGS. 10, 11 and 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus, coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus, a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
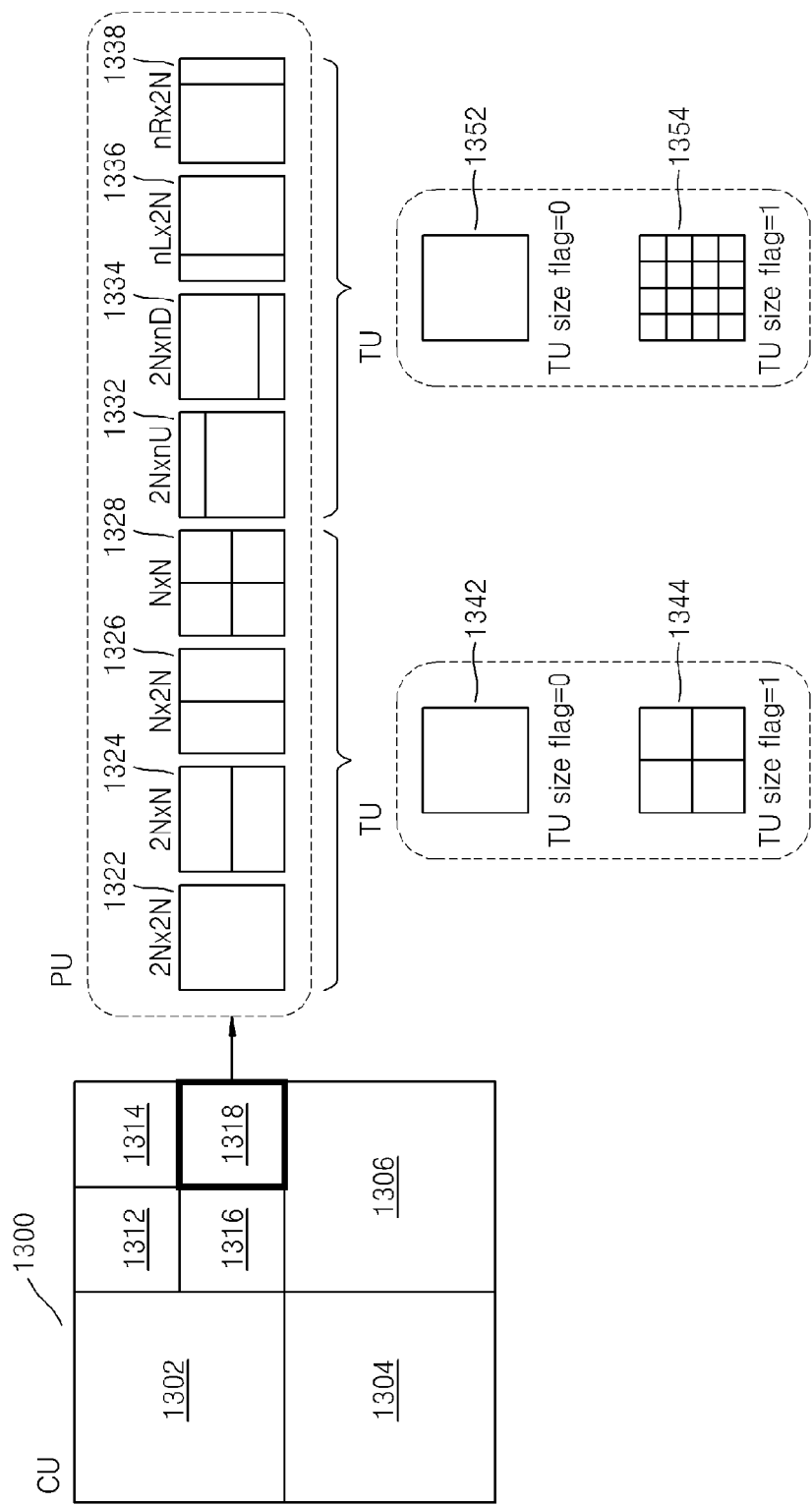
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, e.g., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, e.g., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

A motion compensation process performed by the motion compensator 425 of the image encoder 400 of FIG. 4 and the intra predictor 550 of the image decoder 500 of FIG. 5 will be explained in detail.

Figure 14:
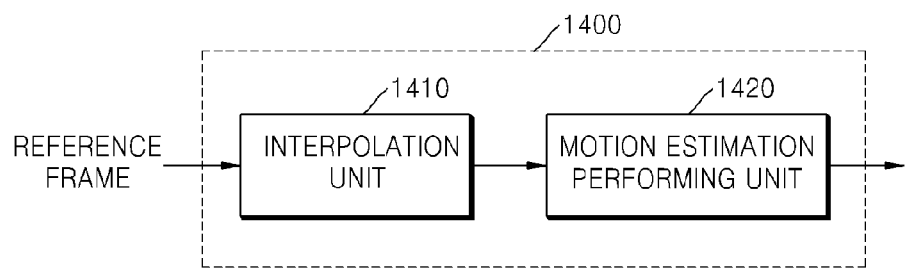
FIG. 14 is a diagram illustrating a motion estimation apparatus according to an exemplary embodiment.

FIG. 14 is a diagram illustrating a motion estimation apparatus 1400 according to an exemplary embodiment. The motion estimation apparatus 1400 of FIG. 14 corresponds to the motion estimator 420 of the image encoder 400 of FIG. 4.

An interpolation unit 1410 generates an interpolated reference frame by interpolating a reference frame and generating a pixel value of a subpixel position. A motion estimation performing unit 1420 performs motion estimation at a subpixel precision by using the interpolated reference frame, and determines and outputs a motion vector indicating a corresponding region of the reference frame which is most similar to a prediction unit. The motion compensator 425 of FIG. 4 obtains a prediction value of pixels of the prediction unit by obtaining an interpolated subpixel or an integer pixel of the reference frame indicated by the motion vector. Although the interpolation unit 1410 is included in the motion estimation apparatus 1400 in FIG. 14, the present exemplary embodiment is not limited thereto and the interpolation unit 1410 may be separated from the motion estimation apparatus 1400.

Figure 15:
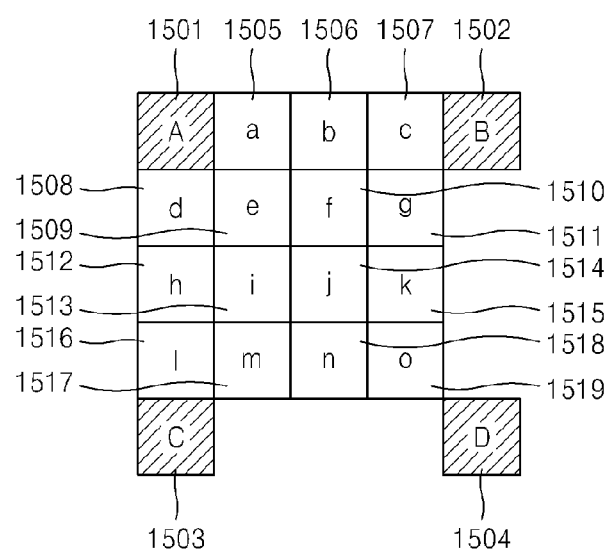
FIG. 15 is a diagram illustrating positions of a subpixel and an integer pixel selectable during motion compensation at a ¼ pixel precision, according to an exemplary embodiment.

FIG. 15 is a diagram illustrating positions of a subpixel and an integer pixel selectable in a motion compensation process at a ¼ pixel precision, according to an exemplary embodiment.

Referring to FIG. 15, A 1501, B 1502, C 1503, and D 1504 labeled with upper-case letters indicate integer pixels, and a 1505 through o 1519 labeled with lower-case letters indicate subpixels between integer pixels. When a motion vector indicates any one of the integer pixels A 1501, B 1502, C 1503, and D 1504, that is, when both horizontal and vertical components of the motion vector have integer values, a prediction value of a prediction unit may be obtained by directly reading out data of a reference frame stored in a memory during a motion compensation process. Accordingly, when horizontal and vertical components of a motion vector have integer values, an interpolation process is not needed. For example, when a current prediction unit is L×M (L and M are integers) and a horizontal component MVx and a vertical component MVy of a motion vector MV obtained after motion estimation performed on the current prediction unit L×M have integer values, the motion compensator 425 may obtain a prediction value of the current prediction unit L×M by obtaining L×M integer pixels corresponding to a corresponding region of a position obtained by shifting the current prediction unit L×M from the reference frame stored in the memory by a motion vector (MVx, MVy).

When the motion vector indicates any one subpixel from among the a 1505 through o 1519 subpixels instead of indicating an integer pixel, an interpolation process is needed in order to obtain the corresponding subpixel. The interpolation process of the subpixel may be performed by applying an interpolation filter having a predetermined filter tap number to integer pixels of the reference frame. In a 1505, b 1506, and c 1507 which are subpixels disposed between the integer pixels A 1501 and B 1502 which are horizontally adjacent to each other, only a horizontal component has a fractional value, and a vertical component has an integer value. Accordingly, in order to interpolate the subpixels a 1505, b 1506, and c 1507, a horizontal one-dimensional (1D) interpolation process is performed. Likewise, in d 1508, h 1512, and l 1516 which are subpixels disposed between the integer pixels A 1501 and C 1503 which are vertically adjacent to each other, only a vertical component has a fractional value and a horizontal component has an integer value. Accordingly, in order to interpolate the subpixels d 1508, h 1512, and l 1516, a vertical 1D interpolation process is performed.

In subpixels e 1509, f 1510, g 1511, i 1513, j 1514, k 1515, m 1517, n 1518, and o 1519 other than the subpixels a 1505, b 1506, c 1507, d 1508, h 1512, and l 1516, since both horizontal and vertical components have fractional values, a horizontal and vertical two-dimensional (2D) interpolation process is performed.

As such, the term 1D interpolation process as used herein according to an exemplary embodiment refers to a process of performing interpolation only in one direction from among a horizontal direction and a vertical direction during a motion compensation process since any one of a horizontal component and a vertical component of a motion vector has a fractional value instead of an integer value. Further, the term 2D interpolation process as used herein according to an exemplary embodiment refers to a process of performing interpolation in horizontal and vertical directions since both a horizontal component and a vertical component of a motion vector have fractional values instead of integer values.

Figure 16:
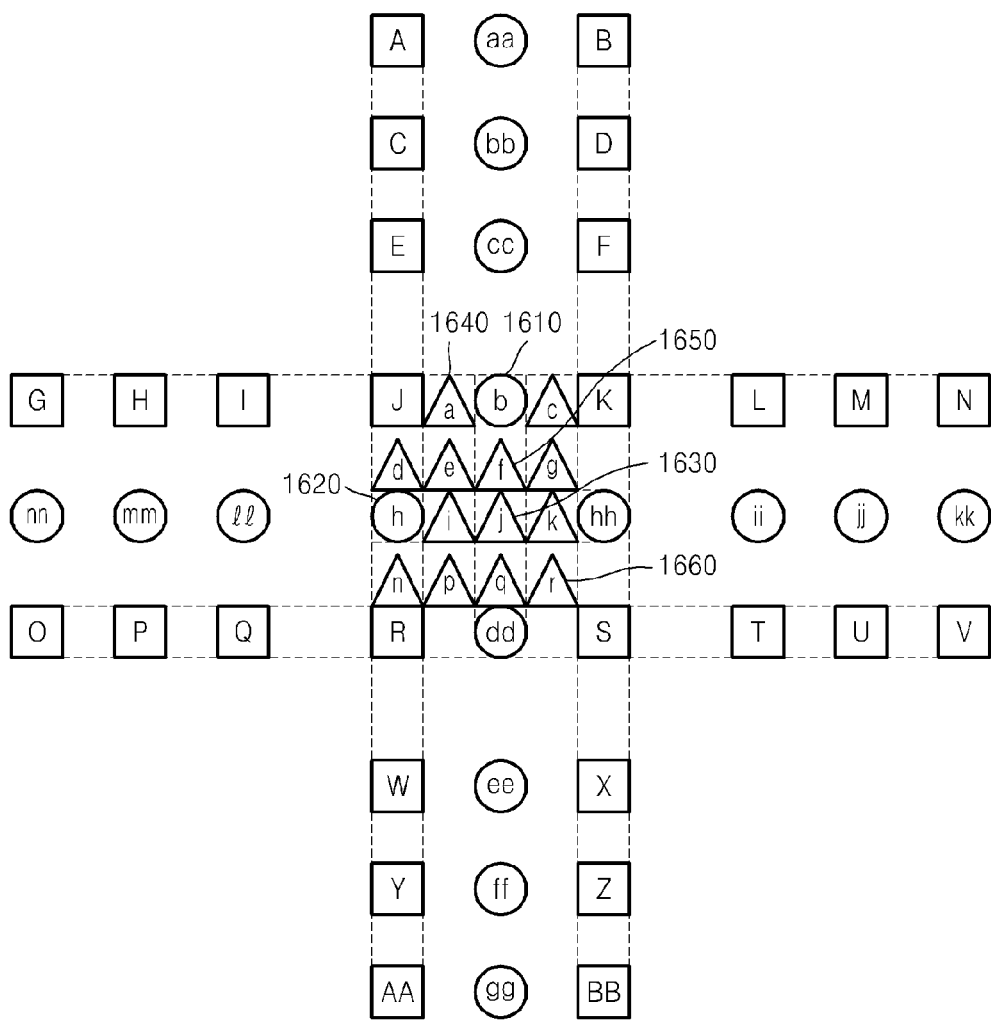
FIG. 16 is a diagram for explaining a process of interpolating a reference frame, according to an exemplary embodiment.

FIG. 16 is a diagram for explaining a process of interpolating a reference frame, according to an exemplary embodiment. In FIG. 16, upper-case letters A through Z denote integer pixels, and lower-case letters a through z denote ½ or ¼ subpixels.

The interpolation unit 1410 applies an interpolation filter having a predetermined filter tap number to integer pixels in order to generate a subpixel needed for motion estimation and motion compensation. For example, referring to FIG. 16, the interpolation unit 1410 may generate subpixels by applying an N-(N is an integer) tap interpolation filter to integer pixel signals A through Z in a horizontal or vertical direction. An 8-tap interpolation filter may be used in order to interpolate a luminance component, and a 4-tap interpolation filter may be used in order to interpolate a chroma component. A filter tap number N is not limited thereto, and may be changed.

A process of interpolating subpixels will be explained in more detail with reference to FIG. 16.

In order to interpolate a, b, c, d, h, and n which are subpixels located on the same row or column as integer pixels, the subpixels a, b, c, d, h, and n may be generated by reading out N integer pixels according to a filter tap number in any one direction from among horizontal and vertical directions, and applying an interpolation filter to the read N integer pixels as described above. For example, the ½ subpixel b 1610 may be generated by applying an 8-tab interpolation filter having a tap coefficient of {p1, p2, p3, p4, p5, p6, p7, p8} to G, H, I, J, K, L, M, and N which are 8 integer pixels horizontally adjacent to the subpixel b 1610 by using Equation b=(G*p1+H*p2+I*p3+J*p4+K*p5+L*p6+M*p7+N*p8). Likewise, the ½ subpixel h 1620 may be generated by applying an 8-tab interpolation filter having a tap coefficient of {p1, p2, p3, p4, p5, p6, p7, p8} to A, C, E, J, R, W, Y, AA which are 8 integer pixels vertically adjacent to the subpixel h 1620 by using Equation h=(A*p1+C*p2+E*p3+J*p4+R*p5+W*p6+Y*p7+AA*p8). A tap number and a tap coefficient may be changed as described above.

¼ subpixels a, c, d, and n located on the same row or column as integer pixels may be generated by using an average value between the ½ subpixel b 1610 and the ½ subpixel h 1620 which are generated through the above interpolation process, and an integer pixel. For example, the ¼ subpixel a 1640 may be generated by using Equation a=(J+b)/2. As such, in order to interpolate the ½ subpixel b or n or the ¼ subpixels a, c, d, and n located on the same row or column as integer pixels, a process of reading out N (N is a filter tap number) neighboring integer pixels is needed.

Next, a process of interpolating e, f, g, i, j, k, p, q, and r which are subpixels which are not located on the same row or column as integer pixels will be explained.

The ½ subpixel j 1630 may be generated by applying an interpolation filter in an arbitrary direction from among a horizontal direction and a vertical direction. For example, the ½ subpixel j 1630 may be generated by applying an 8-tap interpolation filter to neighboring ½ subpixels nn, mm, ll, h, hh, ii, jj, and kk which are horizontally adjacent, or may be generated by applying an 8-tap interpolation filter to neighboring ½ subpxiels aa, bb, cc, b, dd, ee, ff, and gg which are vertically adjacent. Here, the ½ subpixels nn, mm, ll, h, hh, ii, jj, and kk which are horizontally adjacent may be generated in a similar manner to that used to obtain the ½ subpixel h 1620, and the ½ subpixels aa, bb, cc, b, dd, ee, ff, and gg which are vertically adjacent may be generated in a similar manner to that used to obtain the ½ subpixel b 1610.

¼ subpixels e, f, g, i, k, p, q, and r which are not located on the same row or column as integer pixels may be generated by using an average value filter with a neighboring adjacent integer pixel or ½ subpixel. For example, the ¼ subpixel f 1650 may be obtained by using an average value between the ½ subpixel b 1610 and the ½ subpixel j 1630, and the ¼ subpixel r 1660 may be generated by using a diagonal average filter such as Equation r=(hh+dd)/2.

Figure 17A:
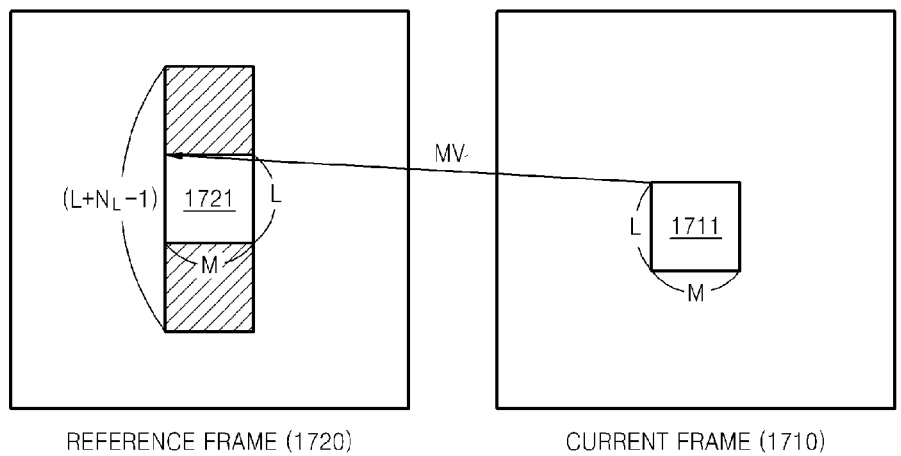
FIGS. 17A, 17B and 17C are diagrams illustrating data of a reference frame needed for a motion compensation process, according to an exemplary embodiment.
Figure 17B:
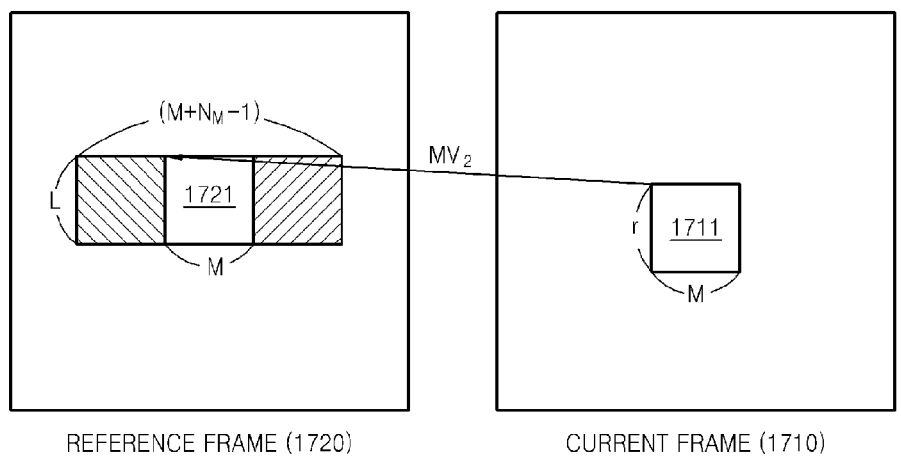
Figure 17C:
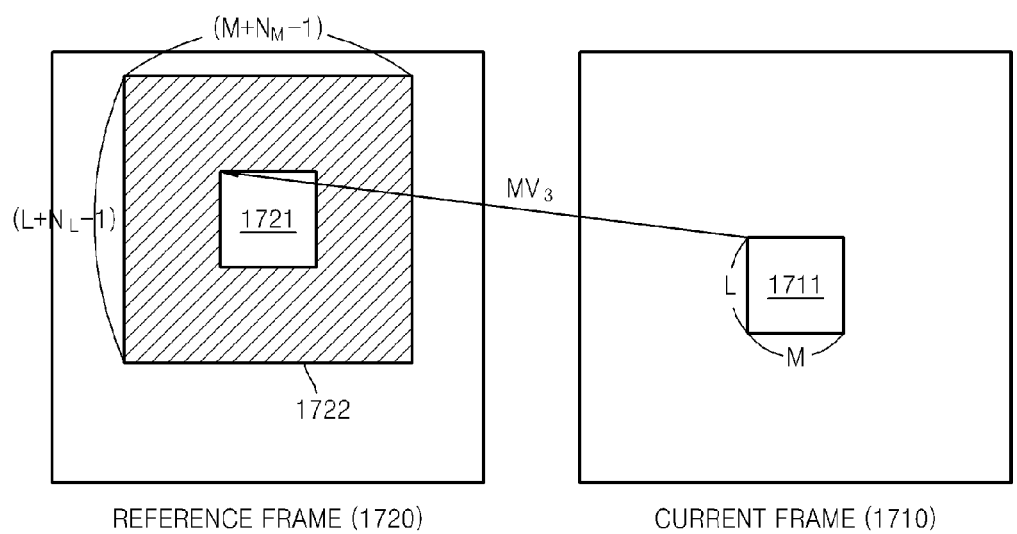

FIGS. 17A, 17B and 17C are diagrams illustrating data of a reference frame to be used for a motion compensation process, according to an exemplary embodiment.

Referring to FIG. 17A, when a motion vector $MV_1$ of a current prediction unit 1711 having a size of L×M (L and M are integers) is determined through motion estimation by the motion estimator 420, the motion compensator 425 generates a prediction value of the current prediction unit 1711 by reading out a correspondence region indicated by the motion vector $MV_1$ in a reference frame 1720 from a memory. It is assumed that a horizontal component of the motion vector $MV_1$ is MVx1, a vertical component of the motion vector $MV_1$ is MVy1, the horizontal component MVx1 has an integer value, and the vertical component MVy1 has a fractional value. In this case, in order to read out the correspondence region 1721, a subpixel between integer pixels which are horizontally adjacent may be generated. If it is assumed that a tap number of an interpolation filter applied in a vertical direction is $N_L$, since a number of vertical integer pixels to be used for vertical interpolation per pixel is $N_L$ and one column of the correspondence region 1721 includes L pixels, in order to read out the correspondence region 1721, $(L+N_L-1)*M$ integer pixels including the vertical integer pixels to be used for interpolation may be read out.

Likewise, referring to FIG. 17B, when a motion vector $MV_2$ of the current prediction unit 1711 is determined through motion estimation by the motion estimator 420, the motion compensator 425 generates a prediction value of the current prediction unit 1711 by reading out the correspondence region 1721 indicated by the motion vector $MV_2$ in the reference frame 1720 from the memory. It is assumed that a horizontal component of the motion vector $MV_2$ is MVx2, a vertical component of the motion vector $MV_2$ is MVy2, the horizontal component MVx2 has a fractional value, and the vertical component MVy2 has an integer value. In this case, in order to read out the correspondence region 1721, a subpixel between horizontally adjacent integer pixels may be generated. If it is assumed that a tap number of an interpolation filter applied in a horizontal direction is $N_M$, a number of horizontal integer pixels needed for horizontal interpolation per pixel is $N_M$ and one row of the correspondence region 1721 includes M pixels, in order to read out the correspondence region 1721, $L*(M+N_M-1)$ integer pixels including the horizontal integer pixels to be used for interpolation may be read out.

Referring to FIG. 17C, when a motion vector $MV_3$ of the current prediction unit 1711 is determined through motion estimation by the motion estimator 420, the motion compensator 425 generates a prediction value of the current prediction unit 1711 by reading out the correspondence region 1721 indicated by the motion vector $MV_3$ in the reference frame 1720 from the memory. It is assumed that a horizontal component of the motion vector $MV_3$ is MVx3, a vertical component of the motion vector $MV_3$ is MVy3, and both the horizontal component MVx3 and the vertical component MVy3 have fractional values. In this case, in order to read out the correspondence region 1721, a subpixel between integer pixels may be generated by performing interpolation in a horizontal direction and a vertical direction. As described above, when it is assumed that a tap number of an interpolation filter applied in a vertical direction is $N_L$ and a tap number of an interpolation filter applied in a horizontal direction is $N_M$, in order to read out the correspondence region 1721, $(L+N_L-1)*(M+N_M-1)$ including horizontal and vertical integer pixels to be used for interpolation may be read out.

As such, a number of integer pixels of a reference frame which are read out in order to interpolate subpixels is determined according to a horizontal component and a vertical component of a motion vector of a current prediction unit.

From a memory access point of view, a number Num of integer pixels of a reference frame needed per pixel of a current prediction unit during motion compensation may be obtained by using Equation Num=(number of pixels of a reference frame needed for motion compensation of a current prediction unit)/(total number of pixels included in the current prediction unit). As described above, it is assumed that a tap number of an interpolation filter applied in a vertical direction is $N_L$, a tap number of an interpolation filter applied in a horizontal direction is $N_M$, a horizontal component of a motion vector of a current prediction unit is MVx, and a vertical component of the motion vector of the current prediction unit is MVy. When only the horizontal component MVx of the motion vector has a fractional value instead of an integer value, since of a number of pixels of a reference frame to be used for motion compensation of the current prediction unit having a size of L×M is $(L+N_L-1)*M$, a number Num of integer pixels of the reference frame per pixel of the current prediction unit during motion compensation is $Num=(L+N_L-1)*M/(L*M)$.

Likewise, when only the vertical component MVy of the motion vector has a fractional value instead of an integer value, since a number of pixels of the reference frame to be used for motion compensation of the current prediction unit having the size of L×M is $L*(M+N_M-1)$, a number Num of integer pixels of the reference frame per pixel of the current prediction unit during motion compensation is $Num=L*(M+N_M-1)/(L*M)$.

When the horizontal component MVx and the vertical component MVy of the motion vector have fractional values, instead of integer values, since a number of pixels of the reference frame to be used for motion compensation of the current prediction unit having the size of L×M is $(L+N_L-1)*(M+N_M-1)$, a number Num of integer pixels of the reference frame per pixel of the current prediction unit during motion compensation is $Num=(L+N_L-1)*(M+N_M-1)/(L*M)$.

As such, a number Num of integer pixels of a reference frame per pixel of a current prediction unit during motion compensation corresponds to that in the case of unidirectional prediction. In the case of bidirectional prediction, since two reference frames are used, a number of integer pixels is 2*Num.

As will be described below, a number Num of pixels of a reference frame to be used for motion compensation per one pixel of a current prediction unit is classified according to a size of the current prediction unit and a unidirectional motion estimation mode and a bidirectional motion estimation mode applied to the current prediction unit, and access to a predetermined memory device storing the reference frame is limited by applying both the unidirectional motion estimation mode and the bidirectional motion estimation mode to the current prediction unit when the number of the pixels of the reference frame to be used for motion compensation per one pixel of the current prediction unit is equal to or less than a predetermined threshold value and applying only the unidirectional motion estimation mode to the current prediction unit when the number of the pixels of the reference frame to be used for motion compensation per one pixel of the current prediction unit is greater than the predetermined threshold value. That is, during motion compensation, when a number of pixels of a reference frame per one pixel is too great, memory access for reading out reference frame data in a motion compensation process is limited by limiting the motion compensation process.

FIGS. 18A, 18B, 18C, 18D, 18E, 18F, and 18G are tables illustrating a number of pixels of a reference frame to be used for motion compensation per one pixel of a current prediction unit according to a size of a prediction unit, a prediction mode, and whether horizontal and vertical components of a motion vector of the prediction unit have integer values. In FIGS. 18A through 18G, I indicates a case where both a horizontal component and a vertical component of a motion vector have integer values, ID indicates a case where any one of a horizontal component and a vertical component of a motion vector has a fractional value instead of an integer value, and 2D indicates a case where both a horizontal component and a vertical component of a motion vector have fractional values instead of integer values. Also, in the case of bidirectional prediction including L0 prediction that refers to a first reference pixel list and L1 prediction that refers to a second reference picture list, I-I indicates a case where both a horizontal component and a vertical component of each of two motion vectors used for the L0 prediction and the L1 prediction have integer values, ID-ID indicates a case where two motion vectors used for the L0 prediction and the L1 prediction have one horizontal or vertical component having a fractional value instead of an integer value, and 2D-2D indicates a case where a horizontal component and a vertical value of two motion vectors used for the L0 prediction and the L1 prediction have fractional values instead of integer values. Also, I-1D indicates a case where both a horizontal component and a vertical component of one motion vector from among two motion vectors used for the L0 prediction and the L1 prediction have integer values, and any one of a horizontal component and a vertical component of the remaining motion vector has a fractional value instead of an integer value. Also, I-2D indicates a case where both a horizontal component and a vertical component of a motion vector from among two motion vectors used for the L0 prediction and the L1 prediction have integer values, and both a horizontal component and a vertical component of the remaining motion vector have fractional values instead of integer values. Also, 1D-2D indicates a case where any one of a horizontal component and a vertical component of one motion vector from among two motion vectors used for the L0 prediction and the L1 prediction has a fractional value instead of an integer value, and both a horizontal component and a vertical component of the remaining motion vectors have fractional values instead of integer values.

In FIGS. 18A through 18G, an interpolation filter having the same tap number N is used as an interpolation filter in a horizontal direction and a vertical direction, and the tap number N has a value ranging from 8 to 2.

Referring to FIG. 18A, when an 8-tap interpolation filter is used, any one of a horizontal component and a vertical component of a motion vector of a prediction unit having a size of 4×8 has a fractional value instead of an integer value, and unidirectional motion estimation is performed on the prediction unit having the size of 4×8, since a total number of integer pixels to be used for motion compensation of the prediction unit having the size of 4×8 is (4+8−1)*8, 2.75 may be obtained by dividing (4+8−1)*8 by 32 pixels included in the prediction unit having the size of 4×8 ((4+8−1)*8/(4×8)=2.75). Through this calculation, as shown in FIG. 18A, when a size of a prediction unit (block) is 4×8, only one of a horizontal component and a vertical component of a motion vector has a fractional value instead of an integer value (in the case 1D), and a unidirectional prediction mode is performed, 2.75, which is a number of integer pixels of a reference frame per one pixel, may be obtained. Similarly, the tables of FIGS. 18A through 18G may be obtained by using any one of $Num=(L+N_L-1)*M/(L*M)$, $Num=L*(M+N_M-1)/(L*M)$, and $Num=(L+N_L-1)*(M+N_M-1)/(L*M)$ which calculate a number of integer pixels of a reference frame per one pixel of a current prediction unit during motion compensation according to whether a horizontal component and a vertical component of a motion vector are integer values or fractional values.

Analyzing the tables of FIGS. 18A through 18G, it is found that a number of integer pixels of a reference frame per one pixel of a current prediction unit during motion compensation decreases as a size of a prediction unit increases. For example, referring to FIG. 18A, in a bidirectional prediction mode (bi-prediction), it is found that when a horizontal component and a vertical component of a motion vector have fractional values instead of integer values (in the case 2D-2D) and a size of a prediction unit increases from 2×2 to 64×64, a number of integer pixels of a reference frame per one pixel decreases from 40.50 to 2.46. As such, when motion estimation and motion compensation are performed on a prediction unit having a size which is too small, since a number of integer pixels of a reference frame per one pixel increases, it is inefficient from a memory access point of view. Accordingly, memory access for reading out reference frame data may be limited to a predetermined bandwidth by limiting a motion estimation mode used when a size of a prediction unit has a size equal to or less than a predetermined threshold value by using both a unidirectional motion estimation mode and a bidirectional motion estimation mode when the size of the prediction unit is greater than the predetermined size and by using only a unidirectional motion estimation mode when the size of the prediction unit is equal to or less than the predetermined size.

FIGS. 19 through 20 are tables illustrating in descending order beginning from a high value a number of pixels of a reference frame to be used for motion compensation per one pixel of a current prediction unit according to a size of a prediction unit of a luminance component, a size of a prediction unit of a chroma component, a prediction mode, and whether a horizontal component and a vertical component of a motion vector of the prediction unit have integer values. In FIG. 19, it is assumed that an 8-tap interpolation filter is used as an interpolation filter for the luminance component, a 4-tap interpolation filter is used as an interpolation component for the chroma component, a size of a minimum prediction unit of the luminance component is 4×8, and a size of a minimum prediction unit of the chroma component is 2×4. When compared with FIG. 19, in FIG. 20, a size of a minimum prediction unit of the luminance component is 4×4 and a size of a minimum prediction unit of the chroma component is 2×2.

Referring to FIG. 19, since an upper position in the table is more inefficient from a memory access point of view, the motion estimator 420 and the motion compensator 425 may limit memory access in a motion compensation process by limiting or changing a motion estimation mode in the case of an upper position. For example, the motion estimator 420 and the motion compensator 425 may perform only a unidirectional motion estimation mode including L0 prediction and L1 prediction when a size of a prediction unit of the luminance component is 4×8 or 8×4 which is a minimum prediction unit, and may perform a bidirectional motion estimation mode other than a unidirectional motion estimation mode only when a size of a prediction unit of the luminance component is greater than 4×8 or 8×4 which is a minimum motion estimation mode. Likewise, the motion estimator 420 and the motion compensator 425 may perform only a unidirectional motion estimation mode including L0 prediction and L1 prediction when a size of a prediction unit of the chroma component is 2×4 or 4×2 which is a minimum prediction unit, and may perform a bidirectional motion estimation mode other than a unidirectional motion estimation mode only when a size of a prediction unit of the chroma component is greater than 2×4 or 4×2 which is a minimum prediction unit.

Likewise, referring to FIG. 20, the motion estimator 420 and the motion compensator 425 may limit memory access in a motion compensation process by limiting or changing a motion estimation mode in the case of an upper position.

As described above, the motion estimator 420 and the motion compensator 425 limit a motion estimation mode when a number of pixels of a reference frame to be used for motion compensation per one pixel of a current prediction unit is equal to or greater than a predetermined threshold value from a memory access point of view. That is, the motion estimator 420 and the motion compensator 425 determine that both a unidirectional motion estimation mode and a bidirectional motion estimation mode are to be used when a size of a current prediction unit is greater than a predetermined size, and determine that only a unidirectional motion estimation mode is to be used when a size of a current prediction unit is equal to or less than a predetermined size. The motion estimator 420 and the motion compensator 425 may determine that a motion estimation mode is not to be used when a size of a current prediction unit is too small. For example, the motion estimator 420 and the motion compensator 425 may set a size of a minimum prediction unit to 4×8 or 8×4 for a prediction unit of the luminance component, and may not perform motion estimation when a current prediction unit of the luminance component is less than 4×8 or 8×4. Also, the motion estimator 420 and the motion compensator 425 may set a size of a minimum prediction unit to 2×4 or 4×2 for a prediction unit of the chroma component, and may not perform motion estimation when a current prediction unit of the chroma component is less than 2×4 or 4×2. The motion estimator 420 and the motion compensator 425 may classify a motion estimation mode to be performed even when a size is equal to or greater than a size of a minimum prediction unit, and may determine that only a unidirectional motion estimation mode is to be used when a size of a most inefficient current prediction unit is a size of a minimum prediction unit and determine that both a unidirectional motion estimation mode and a bidirectional motion estimation mode are to be used only when a size of a current prediction unit is not a size of a minimum prediction unit, that is, a size of a current prediction unit is greater than a size of a minimum prediction unit.

As such, the motion estimator 420 and the motion compensator 425 determine whether a unidirectional motion estimation mode and a bidirectional motion estimation mode applied to motion estimation and motion compensation of a current prediction unit are to be used based on a size of the current prediction unit, and perform motion estimation and motion compensation for the current prediction unit by using at least one motion estimation mode from among a unidirectional motion estimation mode and a bidirectional motion estimation mode according to whether the unidirectional motion estimation mode and the bidirectional motion estimation mode are to be used. A controller not shown in FIG. 4 determines an optimum motion estimation mode to be applied to a current prediction unit based on an encoding cost, for example, an RD cost, of the current prediction unit obtained through motion estimation and motion compensation. An entropy encoder 460 encodes determined motion estimation mode information based on a size of the current prediction unit.

For example, the entropy encoder 460 determines a syntax inter_pred_idc indicating a final (e.g., optimum) motion estimation mode for the current prediction unit based on a size of the current prediction unit based on Table 2, and encodes the syntax inter_pred_idc.

TABLE 2

| inter_pred_idc | Corresponding motion estimation mode | |
| --- | --- | --- |
| | When a size of a prediction unit is greater than a size of a minimum prediction unit | When a size of a prediction unit is equal to a size of the minimum prediction unit |
| 0 | L0 prediction | L0 prediction |
| 1 | L1 prediction | L1 prediction |
| 2 | Bidirectional prediction | Not Allowed |

Referring to Table 2, the entropy encoder 460 entropy-encodes inter_pred_idc indicating a final motion estimation mode for a current prediction unit based on a size of the current prediction unit. In detail, when the current prediction unit has a size greater than 4×8 or 8×4 which is a minimum prediction unit as a prediction unit of a luminance component, both unidirectional prediction (L0 prediction and L1 prediction) and bidirectional prediction may be used. When L1 prediction is determined as a final motion estimation mode of a current prediction unit, the entropy encoder 460 entropy-encodes 1 as inter_pred_idc. The entropy decoder 520 at a decoder side may determine a motion estimation mode used for the current prediction unit according to Table 2 based on inter_pred_idc and size information of the current prediction unit obtained from a bitstream. Alternatively, when a current prediction unit is a minimum prediction unit of 4×8 or 8×4 which is a minimum prediction unit as a prediction unit of a luminance component, only unidirectional prediction (L0 prediction and L1 prediction) may be used. When L1 prediction is determined as a final motion estimation mode of a current prediction unit, the entropy encoder 460 entropy-encodes 1 as inter_pred_idc.

Motion compensation is performed by limiting whether a unidirectional motion estimation mode and a bidirectional motion estimation mode are used based on a size of a prediction unit from a memory access point of view (e.g., based on memory access considerations). Alternatively, a tap number of an interpolation filter used for motion estimation may be reduced. For example, a 4-tap interpolation filter may be used instead of an 8-tap interpolation filter used to interpolate a luminance component, or a 2-tap interpolation filter may be used instead of a 4-tap interpolation filter used to interpolate a chroma component.

Alternatively, a process of reading out reference frame data may be reduced by replacing a 2D interpolation process with a 1D interpolation process.

Figure 21:
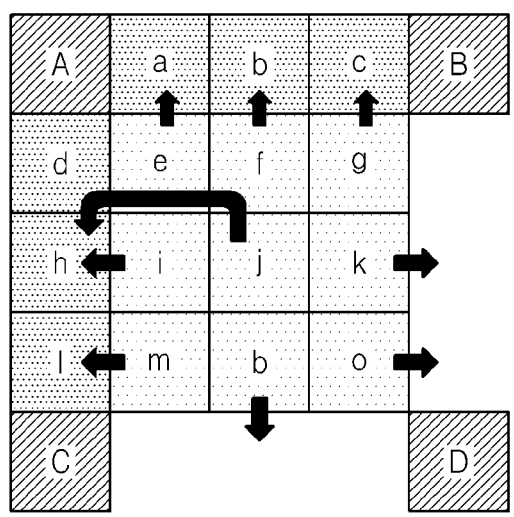
FIGS. 21, 22 and 23 are reference diagrams for explaining an interpolation process for reducing a process of reading out data of a reference frame, according to another exemplary embodiment.
Figure 22:
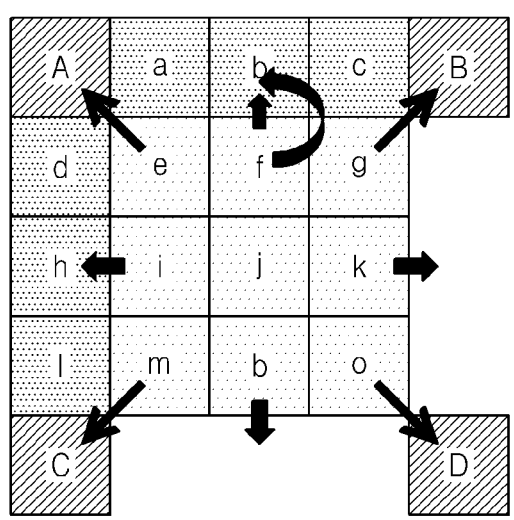
Figure 23:
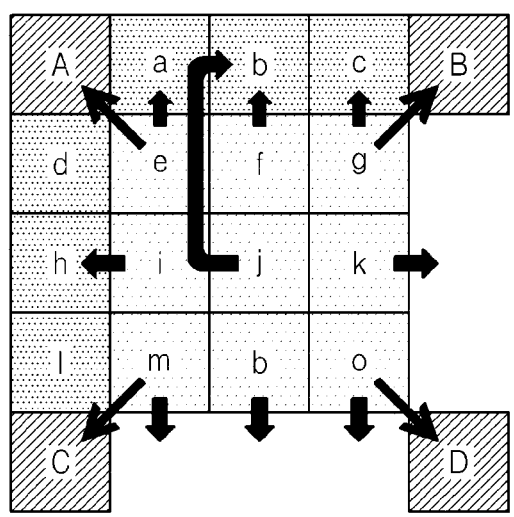

FIGS. 21, 22 and 23 are reference diagrams for explaining an interpolation process for reducing a process of reading out reference frame data, according to another exemplary embodiment.

Referring to FIGS. 21 through 23, since subpixels e, f, g, i, j, k, m, n, and o which are not located on the same row or column as integer pixels may not be obtained by using only a 1D interpolation filter and may be obtained through a 2D interpolation process, memory access is increased. Accordingly, according to another exemplary embodiment, values of the subpixels e, f, g, i, j, k, m, n, and o may be obtained by using a neighboring subpixel or integer pixel obtained through a 1D interpolation filter without performing a 2D interpolation process on the subpixels e, f, g, i, j, k, m, n, and o.

Referring to FIGS. 21 through 23, the motion estimator 420 and the motion compensator 425 may use neighboring subpixels or integer pixels marked by arrows in order to generate values of the subpixels e, f, g, i, j, k, m, n, and o.

FIGS. 24 and 25 are tables illustrating in descending order beginning from a high value a number of pixels of a reference frame to be used for motion compensation per one pixel of a current prediction unit according to a size of a prediction unit of a luminance component, a size of a prediction unit of a chroma component, a motion estimation mode, and whether horizontal and vertical components of a motion vector of the prediction unit have integer values, when interpolation is performed by using a neighboring subpixel or integer pixel which may be obtained by using a 1D interpolation filter instead of a 2D interpolation process or reducing a tap number of an interpolation filter, according to another exemplary embodiment. FIG. 24 illustrates a case where a size of a minimum prediction unit of the luminance component is 4×8 and a size of a minimum prediction unit of the chroma component is 2×4. FIG. 25 illustrates a case where a size of a minimum prediction unit of the luminance component is 4×4 and a size of a minimum prediction unit of the chroma component is 2×2. Also, in FIGS. 24 and 25, A indicates a case where a tap number of an interpolation filter is reduced, and B indicates a case where interpolation is performed by using a neighboring subpixel or integer pixel which may be obtained by using a 1D interpolation filter instead of a 2D interpolation process.

Referring to FIGS. 24 and 25, it is found that when interpolation is performed by using a neighboring subpixel or integer pixel which may be obtained by using a 1D interpolation filter instead of a 2D interpolation process or by reducing a tap number of an interpolation filter, a number of pixels of a reference frame to be used for motion compensation per one pixel of a current prediction unit may be less than that of an original case.

Figure 26:
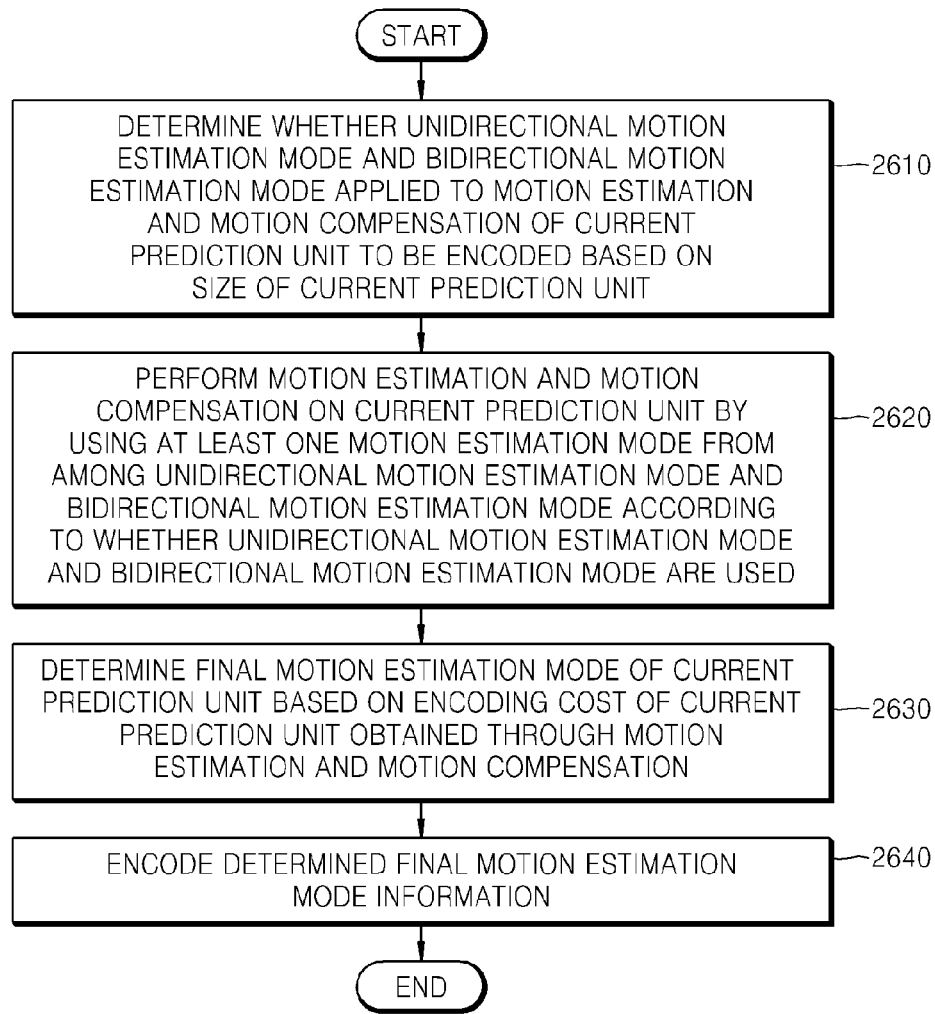
FIG. 26 is a flowchart illustrating a video encoding method according to an exemplary embodiment.

FIG. 26 is a flowchart illustrating a video encoding method according to an exemplary embodiment.

Referring to FIG. 26, in operation 2610, the motion estimator 420 and the motion compensator 425 determine whether a unidirectional motion estimation mode and a bidirectional motion estimation mode applied to motion estimation and motion compensation of a current prediction unit are to be used based on a size of the current prediction unit to be encoded. As described above, the motion estimator 420 and the motion compensator 425 limit a motion estimation mode when a number of pixels of a reference frame to be used for motion compensation per one pixel of the current prediction unit is equal to or greater than a predetermined threshold value from a memory access point of view. That is, the motion estimator 420 and the motion compensator 425 may determine that both a unidirectional motion estimation mode and a bidirectional motion estimation mode are to be used when a size of the current prediction unit is greater than a predetermined size, and may determine that only a unidirectional motion estimation mode is to be used when a size of the current prediction unit is equal to or less than a predetermined size.

In operation 2620, the motion estimator 420 and the motion compensator 425 perform motion estimation and motion compensation on the current prediction unit by applying at least one motion estimation mode from among the unidirectional motion estimation mode and the bidirectional motion estimation mode according to whether the unidirectional motion estimation mode and the bidirectional motion estimation mode are to be used.

In operation 2630, a controller determines a motion estimation mode of the current prediction unit based on an encoding cost of the current prediction unit obtained through motion estimation and motion compensation. In operation 2640, the entropy encoder 460 entropy-encodes determined motion estimation mode information based on a size of the current prediction unit. As described above, the entropy encoder 460 determines a syntax inter_pred_idc indicating a final motion estimation mode for the current prediction unit based on Table 2, and entropy-encodes the syntax inter_pred_idc.

Figure 27:
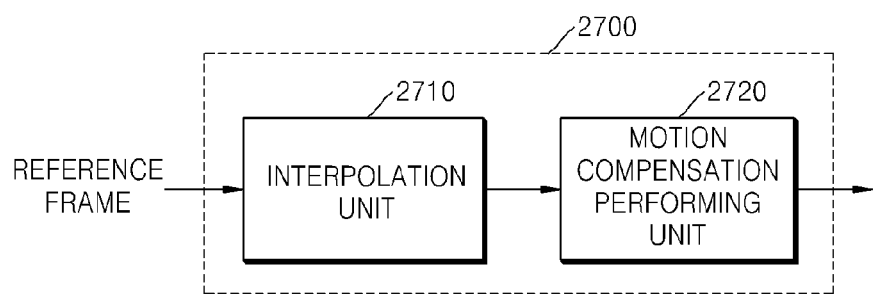
FIG. 27 is a block diagram illustrating a motion compensation apparatus according to an exemplary embodiment.

FIG. 27 is a block diagram illustrating a motion compensation apparatus 2700 according to an exemplary embodiment. The motion compensation apparatus 2700 of FIG. 27 corresponds to the motion compensator 560 of the image decoder 500 of FIG. 5.

Referring to FIGS. 5 and 27, the entropy decoder 520 obtains motion estimation mode information indicating a motion estimation mode to be applied to a current prediction unit and size information of the current prediction unit to be decoded from a bitstream.

As described with reference to FIGS. 1 through 13, information indicating a size of a maximum coding unit obtained by splitting a frame constituting a video from a bitstream, a depth indicating a number of times the maximum coding unit is spatially split, and a structure of transformation units having a hierarchical structure and a prediction unit used for prediction encoding of coding units which are hierarchically classified according to depths may be obtained, and for each at least one maximum coding unit obtained by splitting a frame in a coding unit of a maximum size based on the obtained information, from among the coding units which are hierarchically classified according to depths according to the depth indicating the number of times the maximum coding unit is spatially split, coding units having a tree structure including coding units of a coded depth may be determined, a prediction unit for prediction encoding for each coding unit of the coded depth may be determined, and transformation units having a tree structure may be determined.

Also, as motion estimation mode information, the syntax inter_pred_idc indicating a motion estimation mode applied to the current prediction unit based on a size of the current prediction unit may be used.

A motion compensation performing unit 2720 determines, by using Table 2, a motion estimation mode to be applied to the current prediction unit from among a unidirectional motion estimation mode and a bidirectional motion estimation mode based on a size of the current prediction unit and the obtained motion estimation mode information, that is, the syntax inter_pred_idc.

Referring back to Table 2, when the current prediction unit has a size greater than 4×8 or 8×4 which is a minimum prediction unit as a prediction unit of a luminance component and a value of the syntax inter_pred_idc extracted from the bitstream is 1, the motion compensation performing unit 2720 determines a motion estimation mode of the current prediction unit as unidirectional L1 prediction. Alternatively, when the current prediction unit is a minimum prediction unit of 4×8 or 8×4 which is a minimum prediction unit as a prediction unit of a luminance component, the motion compensation performing unit 2720 determines that a final motion estimation mode of the current prediction unit is L1 prediction when a value of the syntax inter_pred_idc extracted from the bitstream is 1, and determines that a motion estimation mode is not to be applied to the current prediction unit when a value of the syntax inter_pred_idc is 2.

Figure 28:
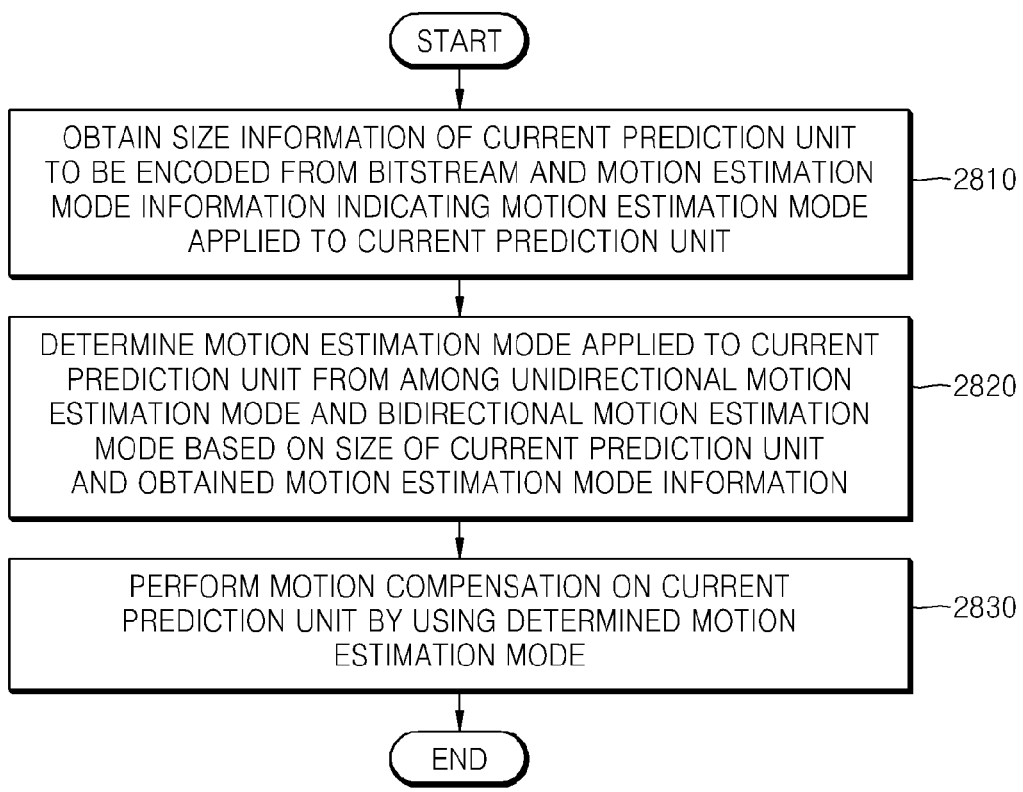
FIG. 28 is a flowchart illustrating a video decoding method according to an exemplary embodiment.

FIG. 28 is a flowchart illustrating a video decoding method according to an exemplary embodiment.

Referring to FIG. 28, in operation 2810, the entropy decoder 520 obtains motion estimation mode information indicating a motion estimation mode to be applied to a current prediction unit and size information of the current prediction unit to be decoded from a bitstream.

In operation 2820, the motion compensator 560 determines a motion estimation mode to be applied to the current prediction unit from among a unidirectional motion estimation mode and a bidirectional motion estimation mode based on a size of the current prediction unit and the obtained motion estimation mode information. As described above, the motion compensator 560 may determine a motion estimation mode to be used for the current prediction unit based on a size of the prediction unit and the syntax inter_pred_idc determined according to Table 2.

In operation 2830, the motion compensator 560 performs motion compensation that obtains a prediction value for the current prediction unit by reading out data of a reference frame according to the determined motion estimation mode.

As a program for executing each of the exemplary embodiments of the video encoding and decoding methods described with reference to FIGS. 1 through 28 may be stored in a computer-readable recording medium, an independent computer system may easily perform operations according to each of the exemplary embodiments using the program stored in the computer-readable recording medium.

An exemplary embodiment where a computer-readable recording medium storing a program is a disc 260 will be explained in detail.

Figure 29A:
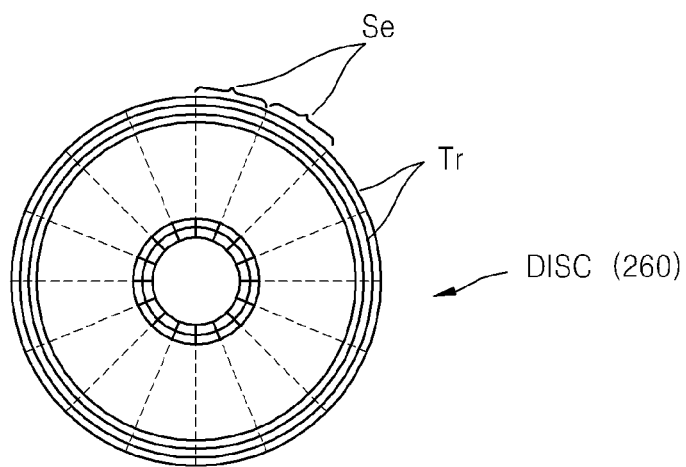
FIG. 29A illustrates a physical structure of a disc that stores a program, according to an exemplary embodiment.

FIG. 29A illustrates a physical structure of a disc 260 that stores a program, according to an exemplary embodiment. The disc 260 which is a storage medium may be a hard drive, a compact disc-read only memory (CD-ROM) disc, a Blu-ray disc, or a digital versatile disc (DVD), although is not limited thereto. The disc 260 includes a plurality of concentric tracks Tf each being divided into a specific number of sectors Se in a circumferential direction of the disc 260. In a specific region of the disc 260, a program that executes a method of predicting multi-view video, a method of prediction restoring multi-view video, a method of encoding multi-view video, and a method of decoding multi-view video as described above may be assigned and stored.

A computer system embodied using a storage medium that stores a program for executing a video encoding method and a video decoding method as described above will now be described with reference to FIG. 29B.

Figure 29B:
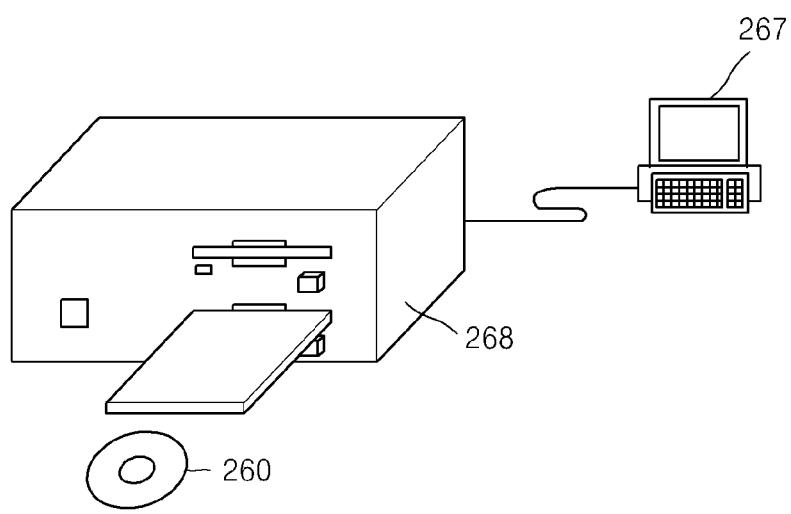
FIG. 29B illustrates a disc drive that records and reads a program by using a disc, according to an exemplary embodiment.

FIG. 29B illustrates a disc drive 268 that records and reads a program by using a disc 260. A computer system 267 may store a program that executes at least one of a video encoding method and a video decoding method according to an exemplary embodiment, in a disc 260 via the disc drive 268. To run the program stored in the disc 260 by the computer system 267, the program may be read from the disc 260 and be transmitted to the computer system 267 by using the disc drive 268.

A program that executes at least one of a video encoding method and a video decoding method according to an exemplary embodiment may be stored not only in the disc 260 illustrated in FIG. 29A or 29B but also in many other types of memory, such as, for example, a memory card, a ROM cassette, or a solid state drive (SSD).

A system to which the video encoding method and a video decoding method described above may be applied to will be described below.

Figure 30:
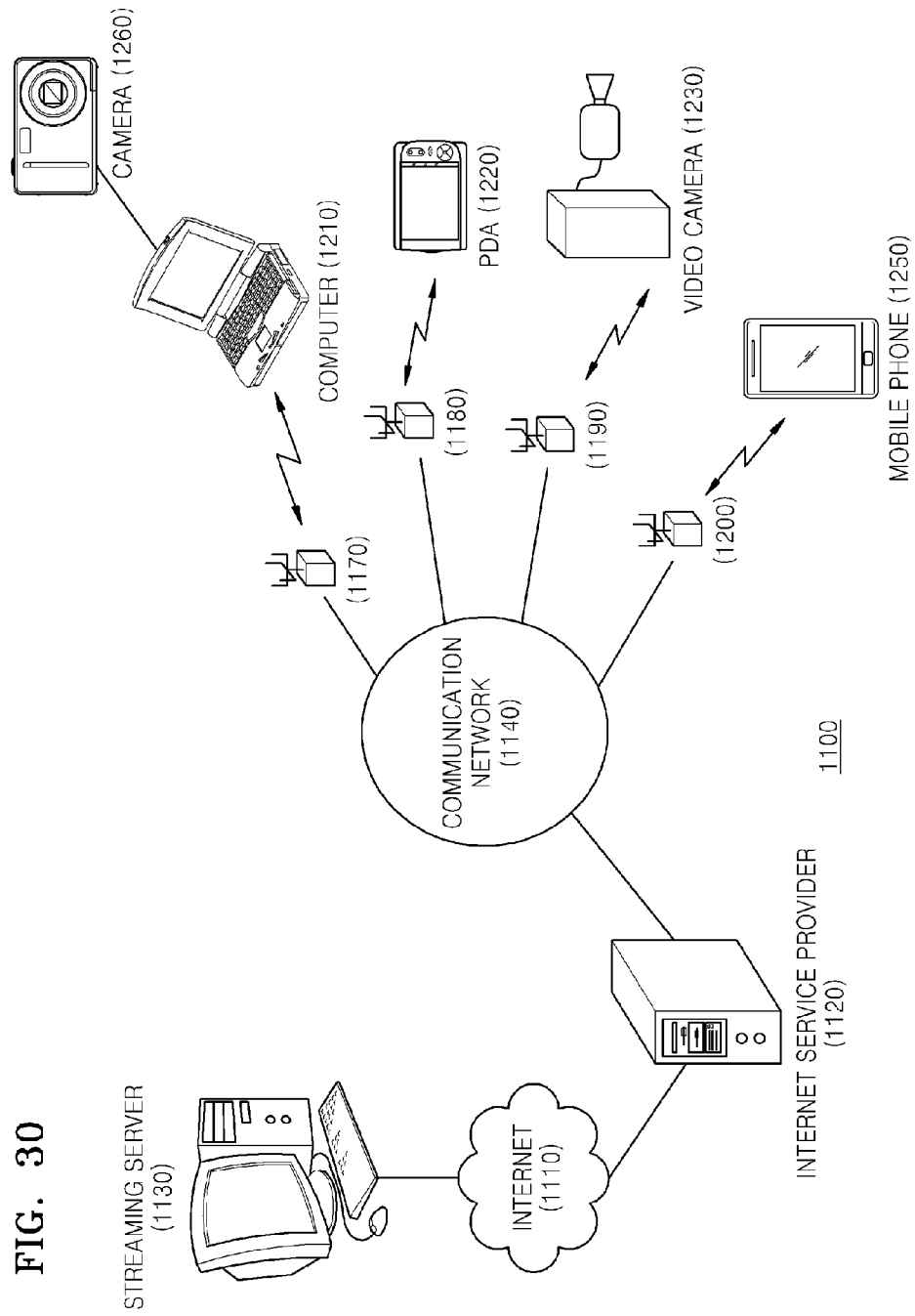
FIG. 30 illustrates an entire structure of a content supply system that provides a content distribution service, according to an exemplary embodiment.

FIG. 30 illustrates an entire structure of a content supply system 1100 that provides a content distribution service. A service region of a communication system is divided into predetermined-sized cells, and wireless base stations 1170, 1180, 1190, and 1200 are installed in these cells, respectively.

The content supply system 1100 includes a plurality of independent devices. For example, the plurality of independent devices, such as a computer 1210, a personal digital assistant (PDA) 1220, a video camera 1230, and a mobile phone 1250, are connected to the Internet 1110 via an internet service provider 1120, a communication network 1140, and the wireless base stations 1170, 1180, 1190, and 1200.

However, the content supply system 1100 is not limited to the configuration illustrated in FIG. 30, and devices may be selectively connected thereto. For example, the plurality of independent devices may be directly connected to the communication network 1140, rather than via the wireless base stations 1170, 1180, 1190, and 1200.

The video camera 1230 is an imaging device, e.g., a digital video camera, which is capable of capturing video images. The mobile phone 1250 may employ at least one communication method from among various protocols, e.g., Personal Digital Communications (PDC), code division multiple access (CDMA), wideband-code division multiple access (W-CDMA), Global System for Mobile Communications (GSM), and Personal Handyphone System (PHS).

The video camera 1230 may be connected to a streaming server 1130 via the wireless base station 1190 and the communication network 1140. The streaming server 1130 allows content received from a user via the video camera 1230 to be streaming-transmitted via a real-time broadcast. The content received from the video camera 1230 may be encoded using the video camera 1230 or the streaming server 1130. Video data captured by the video camera 1230 may be transmitted to the streaming server 1130 via the computer 1210.

Video data captured by a camera 1230 may also be transmitted to the streaming server 1130 via the computer 1210. The camera 1260 is an imaging device capable of capturing both still images and video images, similar to a digital camera. The video data captured by the camera 1260 may be encoded using the camera 1260 or the computer 1210. Software for encoding and decoding of video may be stored in a computer readable recording medium, e.g., a CD-ROM disc, a floppy disc, a hard disc drive, an SSD, or a memory card, which may be accessible by the computer 1210.

If video data is captured by a camera built in the mobile phone 1250, the video data may be received from the mobile phone 1250.

The video data may also be encoded by a large scale integrated circuit (LSI) system installed in the video camera 1230, the mobile phone 1250, or the camera 1260.

According to an exemplary embodiment, the content supply system 1100 may encode content data recorded by a user using the video camera 1230, the camera 1260, the mobile phone 1250, or another imaging device, e.g., content recorded during a concert, and transmit the encoded content data to the streaming server 1130. The streaming server 1130 may streaming-transmit the encoded content data to other clients that request the content data.

The clients are devices capable of decoding the encoded content data, e.g., the computer 1210, the PDA 1220, the video camera 1230, or the mobile phone 1250. Thus, the content supply system 1100 allows the clients to receive and reproduce the encoded content data. Also, the content supply system 1100 allows the clients to receive the encoded content data and decode and reproduce the encoded content data in real time, thereby enabling personal broadcasting.

Encoding and decoding operations of the plurality of independent devices included in the content supply system 1100 may be similar to encoding and decoding operations of a video encoding apparatus and a video decoding apparatus according to an exemplary embodiment.

The mobile phone 1250 included in the content supply system 1100 according to an exemplary embodiment will now be described in greater detail with reference to FIGS. 31 and 32.

Figure 31:
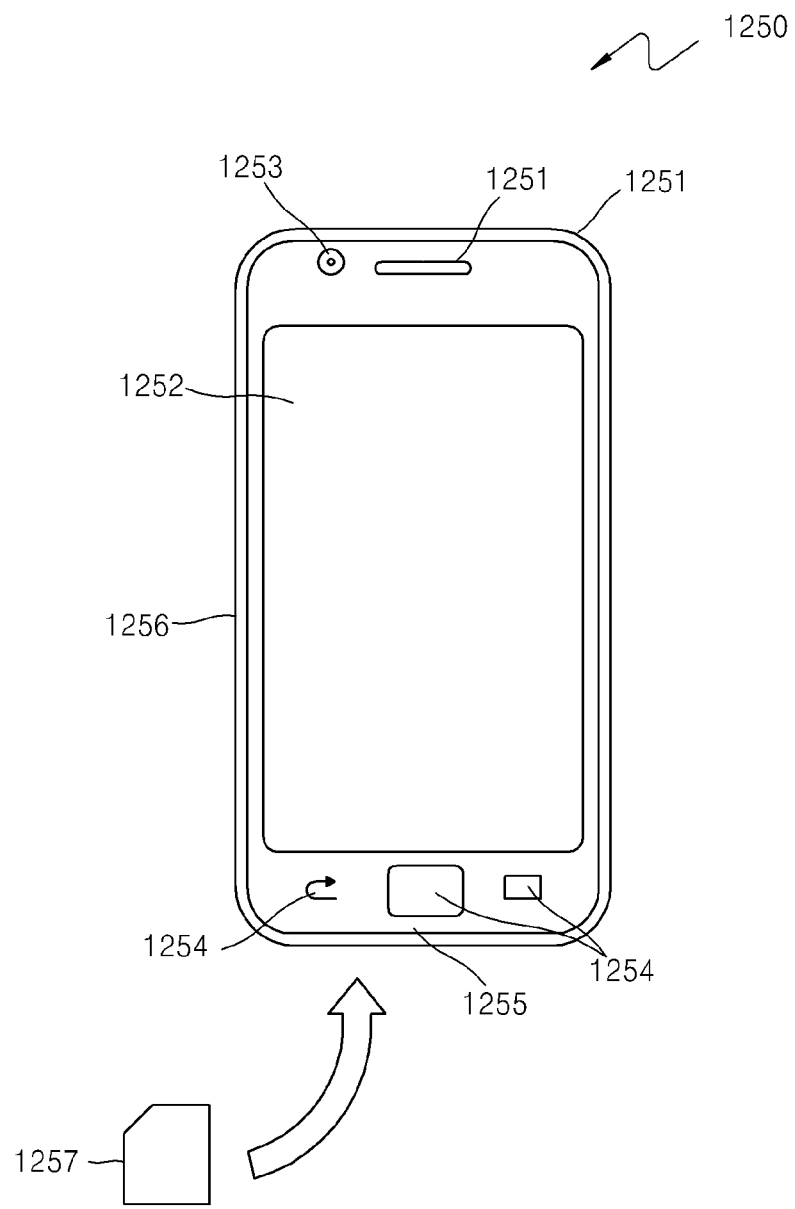
FIGS. 31 and 32 illustrate external and internal structures of a mobile phone to which a video encoding method and a video decoding method are applied, according to an exemplary embodiment.

FIG. 31 illustrates an external structure of a mobile phone 1250 to which a video encoding method and a video decoding method according to exemplary embodiments may be applied, according to an exemplary embodiment. The mobile phone 1250 may be a smart phone, the functions of which are not limited and a large part of the functions of which may be changed or expanded.

The mobile phone 1250 includes an internal antenna 1251 via which a radio-frequency (RF) signal may be exchanged with the wireless base station 1200 of FIG. 26, and includes a display screen 1252 for displaying images captured by a camera 1253 or images that are received via the antenna 1251 and decoded, e.g., a liquid crystal display (LCD) or an organic light-emitting diodes (OLED) screen. The smart phone 1251 includes an operation panel 1254 including a control button and a touch panel. If the display screen 1252 is a touch screen, the operation panel 1254 further includes a touch sensing panel of the display screen 1252. The smart phone 1251 includes a speaker for outputting voice and sound or another type sound output unit, and a microphone 1255 for inputting voice and sound or another type sound input unit. The smart phone 1251 further includes the camera 1253, such as a charge-coupled device (CCD) camera, to capture video and still images. The smart phone 1251 may further include a storage medium 1257 for storing encoded/decoded data, e.g., video or still images captured by the camera 1253, received via email, or obtained according to another method; and a slot 1256 via which the storage medium 1257 is loaded into the mobile phone 1250. The storage medium 1257 may be a flash memory, e.g., a secure digital (SD) card or an electrically erasable and programmable read only memory (EEPROM) included in a plastic case.

Figure 32:
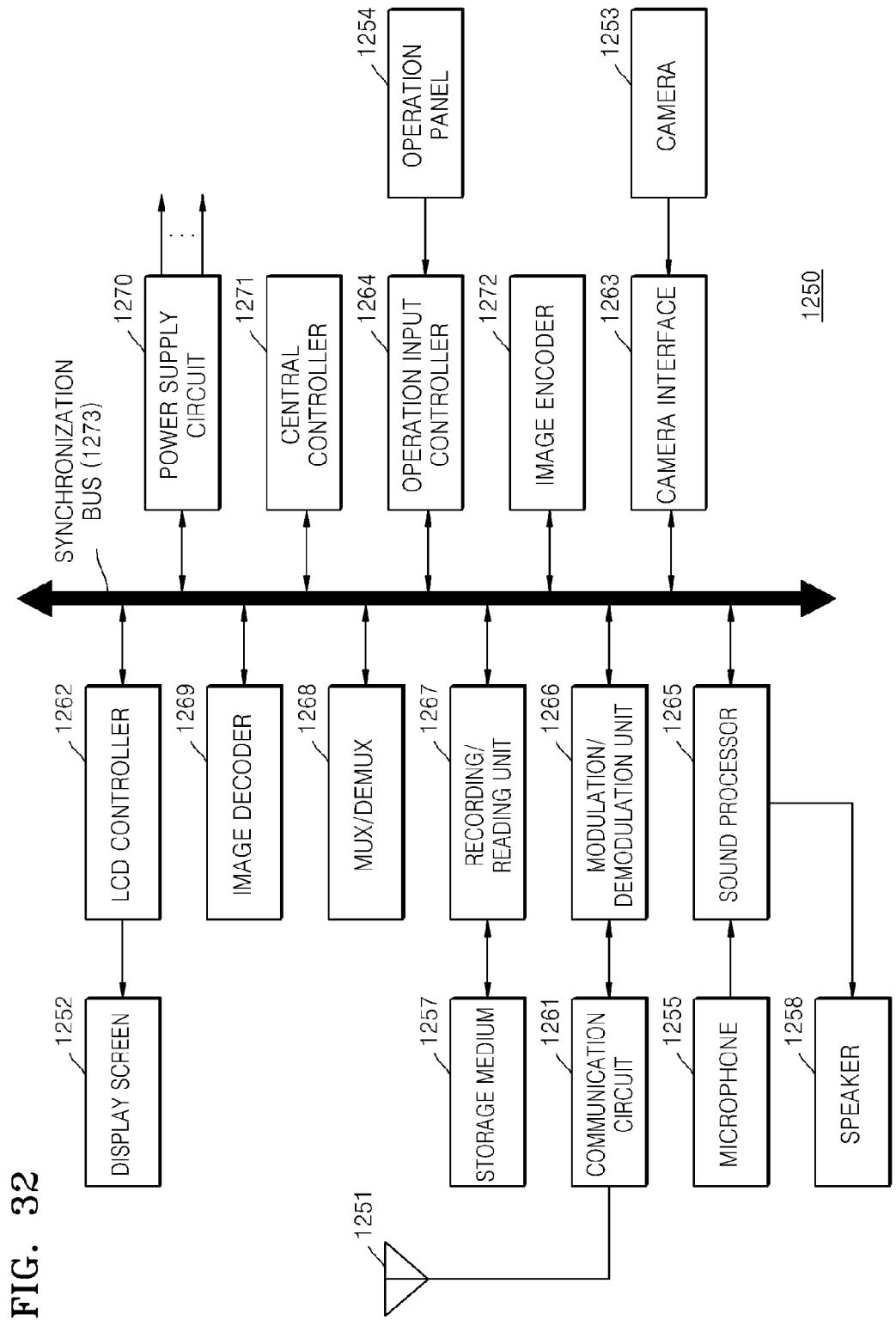

FIG. 32 illustrates an internal structure of the mobile phone 1250, according to an exemplary embodiment. To systemically control parts of the mobile phone 1250 including the display screen 1252 and the operation panel 1254, a power supply circuit 1270, an operation input controller 1264, an image encoder 1272, a camera interface 1263, an LCD controller 1262, an image decoder 1269, a multiplexer/demultiplexer 1268, a recording/reading unit 1267, a modulation/demodulation unit 1266, and a sound processor 1265 are connected to a central controller 1271 via a synchronization bus 1273.

If a user operates a power button and changes from a 'power off' state to a 'power on' state, the power supply circuit 1270 supplies power to all the parts of the mobile phone 1250 from a battery pack, thereby setting the mobile phone 1250 in an operation mode.

The central controller 1271 includes a central processing unit (CPU), a ROM, and a random access memory (RAM).

While the mobile phone 1250 transmits communication data to the outside, a digital signal is generated in the mobile phone 1250 under control of the central controller 1271. For example, the sound processor 1265 may generate a digital sound signal, the image encoder 1272 may generate a digital image signal, and text data of a message may be generated via the operation panel 1254 and the operation input controller 1264. When a digital signal is delivered to the modulation/demodulation unit 1266 under control of the central controller 1271, the modulation/demodulation unit 1266 performs modulation on a frequency band of the digital signal, and a communication circuit 1261 performs digital-to-analog conversion (DAC) and frequency conversion on the frequency band-modulated digital signal. A transmission signal output from the communication circuit 1261 may be transmitted to a voice communication base station or the wireless base station 1200 via the antenna 1251.

For example, when the mobile phone 1250 is in a conversation mode, a sound signal obtained via the microphone 1255 is transformed into a digital sound signal by the sound processor 1265, under control of the central controller 1271. The digital sound signal may be transformed into a transformation signal via the modulation/demodulation unit 1266 and the communication circuit 1261, and may be transmitted via the antenna 1251.

When a text message, e.g., email, is transmitted in a data communication mode, text data of the text message is input via the operation panel 1254 and is transmitted to the central controller 1271 via the operation input controller 1264. Under control of the central controller 1271, the text data is transformed into a transmission signal via the modulation/demodulation unit 1266 and the communication circuit 1261 and is transmitted to the wireless base station 1200 via the antenna 1251.

To transmit image data in the data communication mode, image data captured by the camera 1253 is provided to the image encoder 1272 via the camera interface 1263. The captured image data may be directly displayed on the display screen 1252 via the camera interface 1263 and the LCD controller 1262.

A structure of the image encoder 1272 may correspond to a structure of the video encoding apparatus 100 described above. The image encoder 1272 may transform the image data received from the camera 1253 into compressively encoded image data according to a video encoding method employed by the video encoding apparatus 100 or the image encoder 400 described above according to exemplary embodiments, and then output the encoded image data to the multiplexer/demultiplexer 1268. During a recording operation of the camera 1253, a sound signal obtained by the microphone 1255 of the mobile phone 1250 may be transformed into digital sound data via the sound processor 1265, and the digital sound data may be delivered to the multiplexer/demultiplexer 1268.

The multiplexer/demultiplexer 1268 multiplexes the encoded image data received from the image encoder 1272, together with the sound data received from the sound processor 1265. A result of multiplexing the data may be transformed into a transmission signal via the modulation/demodulation unit 1266 and the communication circuit 1261, and may then be transmitted via the antenna 1251.

While the mobile phone 1250 receives communication data from the outside, frequency recovery and ADC are performed on a signal received via the antenna 1251 to transform the signal into a digital signal. The modulation/demodulation unit 1266 modulates a frequency band of the digital signal. The frequency-band modulated digital signal is transmitted to the image decoder 1269, the sound processor 1265, or the LCD controller 1262, according to the type of the digital signal.

In the conversation mode, the mobile phone 1250 amplifies a signal received via the antenna 1251, and obtains a digital sound signal by performing frequency conversion and ADC on the amplified signal. A received digital sound signal is transformed into an analog sound signal via the modulation/demodulation unit 1266 and the sound processor 1265, and the analog sound signal is output via the speaker 1258, under control of the central controller 1271.

When in the data communication mode, data of a video file accessed via an Internet website may be received, a signal received from the wireless base station 1200 via the antenna 1251 may be output as multiplexed data via the modulation/demodulation unit 1266, and the multiplexed data may be transmitted to the multiplexer/demultiplexer 1268.

To decode the multiplexed data received via the antenna 1251, the multiplexer/demultiplexer 1268 demultiplexes the multiplexed data into an encoded video data stream and an encoded audio data stream. Via the synchronization bus 1273, the encoded video data stream and the encoded audio data stream are provided to the image decoder 1269 and the sound processor 1265, respectively.

A structure of the image decoder 1269 may correspond to a structure of the video decoding apparatus 200 described above. The image decoder 1269 may decode the encoded video data to obtain restored video data and provide the restored video data to the display screen 1252 via the LCD controller 1262, according to a video decoding method employed by the video decoding apparatus 200 or the image decoder 500 described above.

Thus, the data of the video file accessed via the Internet website may be displayed on the display screen 1252. At the same time, the sound processor 1265 may transform audio data into an analog sound signal, and provide the analog sound signal to the speaker 1258. Thus, audio data contained in the video file accessed via the Internet website may also be reproduced via the speaker 1258.

The mobile phone 1250 or another type of communication terminal may be a transceiving terminal including both a video encoding apparatus and a video decoding apparatus according to an exemplary embodiment, may be a transceiving terminal including only the video encoding apparatus, or may be a transceiving terminal including only the video decoding apparatus.

Figure 33:
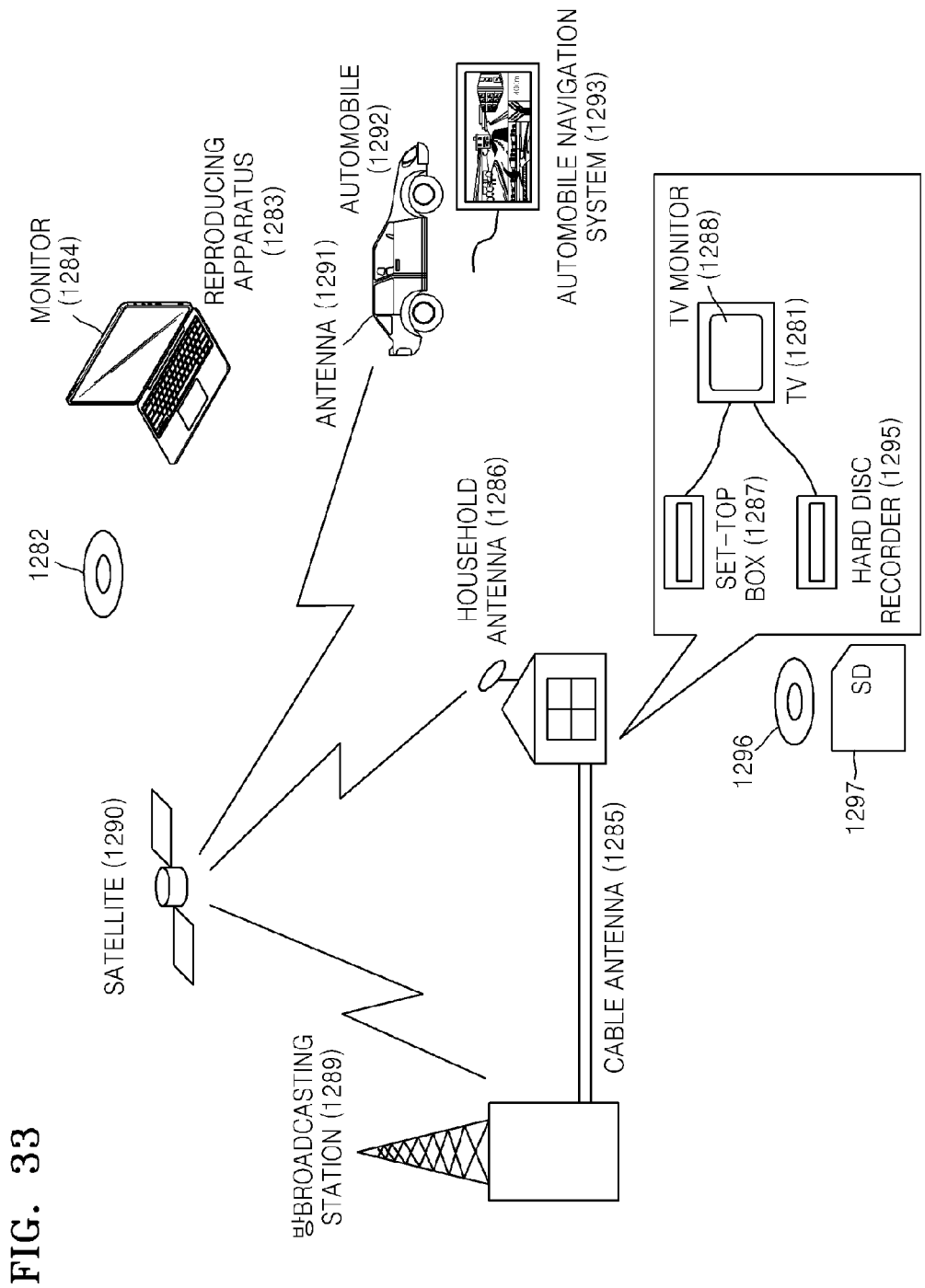
FIG. 33 illustrates a digital broadcasting system employing a communication system, according to an exemplary embodiment.

A communication system according to the exemplary embodiments is not limited to the communication system described above with reference to FIG. 30. For example, FIG. 33 illustrates a digital broadcasting system employing a communication system, according to an exemplary embodiment. The digital broadcasting system of FIG. 33 may receive a digital broadcast transmitted via a satellite or a terrestrial network by using a video encoding apparatus and a video decoding apparatus according to an exemplary embodiment.

Specifically, a broadcasting station 1289 transmits a video data stream to a communication satellite or a broadcasting satellite 1290 by using electronic waves. The broadcasting satellite 1290 transmits a broadcast signal, and the broadcast signal is transmitted to a satellite broadcast receiver via a household antenna 1286. In every house, an encoded video stream may be decoded and reproduced by a TV receiver 1281, a set-top box 1287, or another device.

When a video decoding apparatus according to an exemplary embodiment is included in a reproducing apparatus 1283, the reproducing apparatus 1283 may parse and decode an encoded video stream recorded on a storage medium 1282, such as a disc or a memory card, to restore the original video signal. Thus, the restored video signal may be reproduced, for example, on a monitor 1284.

In the household antenna 1286 for a satellite/terrestrial broadcast or the set-top box 1287 connected to a cable antenna 1285 for receiving cable television (TV) programs, a video decoding apparatus according to an exemplary embodiment may be installed. Data output from the set-top box 1287 may also be reproduced on a TV monitor 1288.

As another example, a video decoding apparatus according to an exemplary embodiment may be installed in the TV receiver 1281 instead of the set-top box 1287.

An automobile 1292 including an appropriate antenna 1291 may receive a signal transmitted from the satellite 1290 or the wireless base station 1170 of FIG. 30. A decoded video may be reproduced on a display screen of an automobile navigation system 1293 built in the automobile 1292.

A video signal may be encoded by a video encoding apparatus according to an exemplary embodiment and may then be stored in a storage medium. Specifically, an image signal may be stored in a DVD disc 1296 by a DVD recorder or may be stored in a hard disc by a hard disc recorder 1295. As another example, the video signal may be stored in an SD card 1297. If the hard disc recorder 1295 includes a video decoding apparatus according to an exemplary embodiment, a video signal recorded on the DVD disc 1296, the SD card 1297, or another storage medium may be reproduced on the TV monitor 1288.

The automobile navigation system 1293 may not include the camera 1253, the camera interface 1263, and the image encoder 1272 of FIG. 32. For example, the computer 1210 and the TV receiver 1281 may not be included in the camera 1253, the camera interface 1263, and the image encoder 1272 of FIG. 32.

Figure 34:
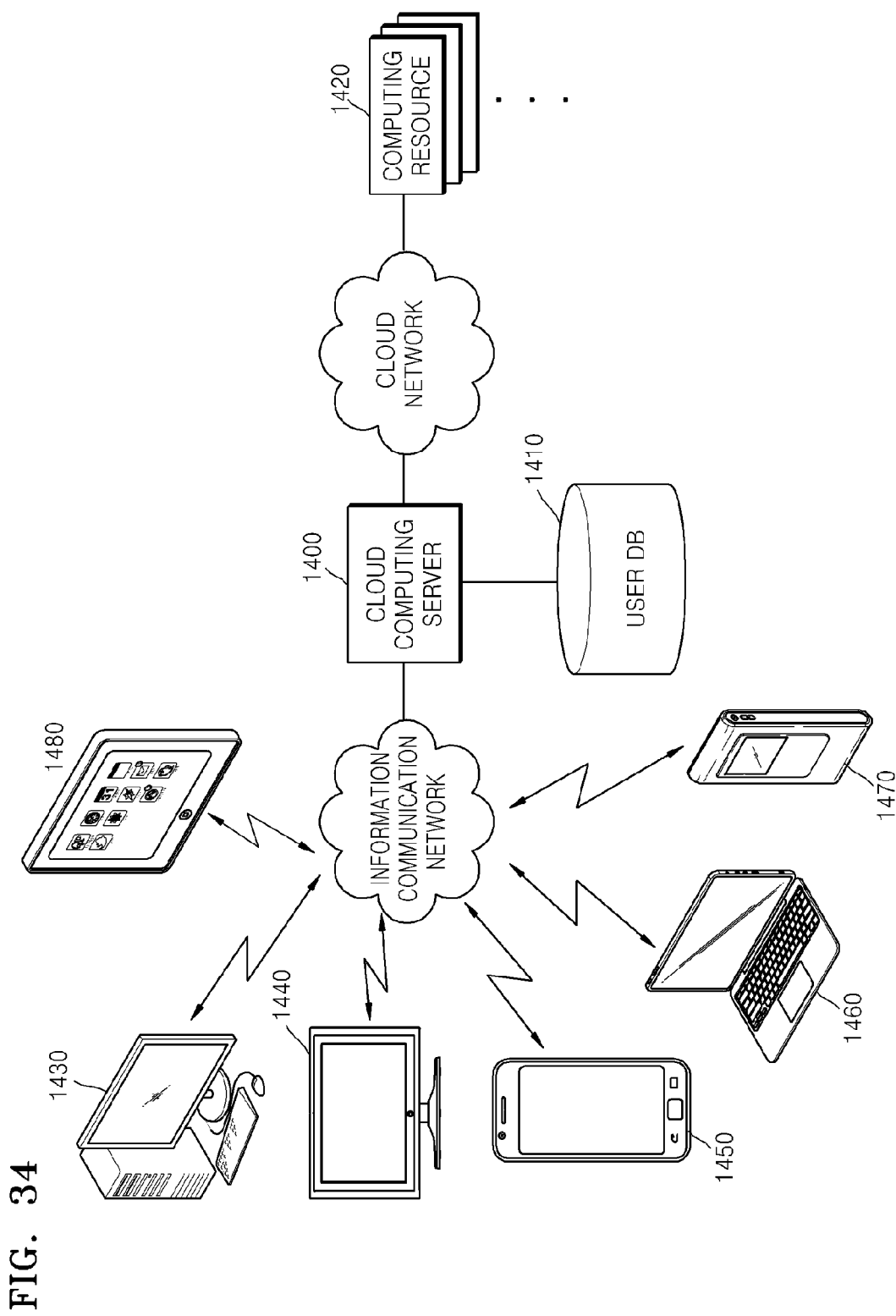
FIG. 34 illustrates a network structure of a cloud computing system using a video encoding apparatus and a video decoding apparatus, according to an exemplary embodiment.

FIG. 34 illustrates a network structure of a cloud computing system using a video encoding apparatus and a video decoding apparatus, according to an exemplary embodiment.

The cloud computing system may include a cloud computing server 1400, a user database (DB) 1410, a plurality of computing resources 1420, and a user terminal.

The cloud computing system provides an on-demand outsourcing service of the plurality of computing resources 1420 via an information communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage facility, an operating system (OS), or security features, into his/her own terminal in order to use them, but may select and use desired services from among services in a virtual space generated through the virtualization technology, at a desired point of time.

A user terminal of a specified service user is connected to the cloud computing server 1400 via an information communication network including the Internet and a mobile telecommunication network. User terminals may be provided with cloud computing services, and particularly motion picture reproduction services, from the cloud computing server 1400. The user terminals may be various types of electronic devices capable of being connected to the Internet, e.g., a desk-top PC 1430, a smart TV 1440, a smart phone 1450, a notebook computer 1460, a portable multimedia player (PMP) 1470, a tablet PC 1480, and the like.

The cloud computing server 1400 may combine the plurality of computing resources 1420 distributed in a cloud network and provide user terminals with a result of the combining. The plurality of computing resources 1420 may include various data services, and may include data uploaded from user terminals. As described above, the cloud computing server 1400 may provide user terminals with desired services by combining a motion picture database distributed in different regions according to the virtualization technology.

User information about users who have subscribed to a cloud computing service is stored in the user DB 1410. The user information may include logging information, addresses, names, and personal credit information of the users. The user information may further include indexes of motion pictures. Here, the indexes may include a list of motion pictures that have already been reproduced, a list of motion pictures that are being reproduced, a pausing point of a motion picture that was being reproduced, and the like.

Information about a motion picture stored in the user DB 1410 may be shared between user devices. For example, when a motion picture service is provided to the notebook computer 1460 in response to a request from the notebook computer 1460, a reproduction history of the motion picture service is stored in the user DB 1410. When a request to reproduce this motion picture service is received from the smart phone 1450, the cloud computing server 1400 searches for and reproduces this motion picture service, based on the user DB 1410. When the smart phone 1450 receives a motion picture data stream from the cloud computing server 1400, a process of reproducing video by decoding the motion picture data stream is similar to an operation of the mobile phone 1250 described above with reference to FIG. 28.

The cloud computing server 1400 may refer to a reproduction history of a desired motion picture service, stored in the user DB 1410. For example, the cloud computing server 1400 may receive a request to reproduce a motion picture stored in the user DB 1410, from a user terminal. If this motion picture was being reproduced, then a method of streaming this motion picture, performed by the cloud computing server 1400, may vary according to the request from the user terminal, e.g., according to whether the motion picture will be reproduced, starting from a starting point thereof or a pausing point thereof. For example, if the user terminal requests to reproduce the motion picture, starting from the starting point thereof, the cloud computing server 1400 streaming-transmits the motion picture starting from a first frame thereof to the user terminal. If the user terminal requests to reproduce the motion picture, starting from the pausing point thereof, the cloud computing server 1400 streaming-transmits the motion picture starting from a frame corresponding to the pausing point, to the user terminal.

In this case, the user terminal may include a video decoding apparatus as described above with reference to FIGS. 1 to 28 according to exemplary embodiments. As another example, the user terminal may include a video encoding apparatus as described above with reference to FIGS. 1 to 28 according to exemplary embodiments. Alternatively, the user terminal may include both the video decoding apparatus and the video encoding apparatus as described above with reference to FIGS. 1 to 28 according to exemplary embodiments.

Various applications of a video encoding method, a video decoding method, a video encoding apparatus, and a video decoding apparatus according to exemplary embodiments described above with reference to FIGS. 1 to 28 have been described above with reference to FIGS. 29A to 34. However, methods of storing the video encoding method and the video decoding method in a storage medium or methods of including the video encoding apparatus and the video decoding apparatus in a device according to various exemplary embodiments are not limited to the exemplary embodiments described above with reference to FIGS. 29A to 34.

Those of ordinary skill in the art would understand the block diagrams disclosed in the exemplary embodiments as conceptual diagrams of circuits for realizing the principles of the exemplary embodiments. Similarly, it would be apparent to those of ordinary skill in the art that arbitrary flow charts, flow diagrams, state transition diagrams, pseudo code, and the like denote various processes that may be substantially stored in a computer readable recording medium and that may be performed by a computer or a processor, regardless of whether the computer or the processor are explicitly illustrated or not. Thus, the exemplary embodiments described above may be embodied as a computer program. The computer program may be stored in a computer readable recording medium, and executed using a general digital computer. Examples of the computer readable medium are a magnetic recording medium (a ROM, a floppy disc, a hard disc, etc.), and an optical recording medium (a CD-ROM, a DVD, etc.).

The functions of various elements illustrated in the drawings may be related to appropriate software, and may be provided via not only hardware capable of executing the software but also exclusive hardware. These functions may also be provided via a single exclusive processor, a single shared processor, or a plurality of individual processors, some of which may be shared. Also, the explicit use of the term 'processor' or 'controller' is not limited to exclusively using hardware capable of executing software, and may implicitly include hardware such as a digital signal processor (DSP), a read-only memory (ROM), a random access memory (RAM), or a non-volatile storage medium for storing software.

In the claims, an element suggested as an element for performing a specific operation includes any arbitrary methods of performing the specific operation. Examples of this element may include a combination of circuit elements capable of performing the specific operation, or software having an arbitrary form, e.g., firmware or microcode, which is combined with an appropriate circuit for executing software for performing the specific operation.

In the present disclosure, the expression 'an exemplary embodiment' and various modifications of this expression refer to specific features, structure, and characteristics related to the exemplary embodiment being included in at least one exemplary embodiment. Thus, the expression 'an exemplary embodiment' and arbitrary other modifications thereof disclosed in the present disclosure do not always indicate the same exemplary embodiment.

In the present disclosure, the expression 'at least one of' such as, for example, 'at least one of A and B', is used to inclusively refer to that only the first option (A) is selected, only the second option (B) is selected, or both the first and second operations (A and B) are selected. In addition, the expression 'at least one of A, B, and C' is used to inclusively refer to that only the first option (A) is selected, only the second option (B) is selected, only the third option (C) is selected, only the first and second options (A and B) are selected, only the second and third options (B and C) are selected, only the first and third (A and C) are selected, or all three options (A, B, and C) are selected. When more than three items are listed in relation to this expression, the meaning thereof would be apparent to those of ordinary skill in the art.

Exemplary embodiments have been described above.

While the present disclosure has been particularly shown and described with reference to exemplary embodiments thereof, it will be understood by those of ordinary skill in the art that various changes in form and details may be made therein without departing from the spirit and scope of the exemplary embodiments as defined by the appended claims. The exemplary embodiments should be considered in a descriptive sense only and not for purposes of limitation. Therefore, the scope of the exemplary embodiments is defined not by the detailed description but by the appended claims, and all differences within the scope will be construed as being included in the exemplary embodiments.

What is claimed is:

1. A video decoding method comprising:
receiving, from a bitstream, partition type information indicating a partition type of a current coding unit;
determining a size of a current prediction unit in the current coding unit based on the partition type information;
obtaining, when the size of the current prediction unit is equal to a predetermined size, motion prediction mode information indicating a single prediction mode for the current prediction unit among a plurality of prediction modes including only an L0 prediction mode and an L1 prediction mode;
obtaining, when the size of the current prediction unit is not equal to the predetermined size, the motion prediction mode information indicating the single prediction mode for the current prediction unit among a plurality of prediction modes including the L0 prediction mode, the L1 prediction mode, and a Bi prediction mode; and
performing an inter-prediction according to the single prediction mode indicated by the motion prediction mode information,
wherein, when the size of the current prediction unit is equal to the predetermined size, the plurality of prediction modes do not include the Bi prediction mode,
wherein the single prediction mode is determined depending on the determined size of the current prediction unit,
wherein the predetermined size of the current prediction unit is 4×8 or 8×4,
wherein a maximum coding unit is hierarchically split into at least one coding unit of depths according to split information,
a coding unit of a current depth is one of rectangular data units split from a coding unit of an upper depth among the at least one coding unit of depths,
when the split information indicates a split of the coding unit of the current depth, the coding unit of the current depth is split into coding units of a lower depth, independently from neighboring coding units, and
when the split information indicates a non-split of the coding unit of the current depth, at least one prediction unit comprising the current prediction unit is obtained from the coding unit of the current depth based on the partition type information.

2. The video decoding method of claim 1,
wherein the partition type does not indicate whether a mode of the current prediction unit is a direct mode.

* * * * *